(12) United States Patent
Yamaga et al.

(10) Patent No.: US 12,731,609 B2
(45) Date of Patent: Sep. 8, 2026

(54) MAGNETIC RECORDING TAPE MEDIUM WITH CONDUCTIVE PARTICLE CONFIGURATION AND CARTRIDGE

(71) Applicant: Sony Group Corporation, Tokyo (JP)

(72) Inventors: Minoru Yamaga, Tokyo (JP); Yuuko Kamoshita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 77 days.

(21) Appl. No.: 18/844,710

(22) PCT Filed: Mar. 28, 2023

(86) PCT No.: PCT/JP2023/012565
§ 371 (c)(1),
(2) Date: Sep. 6, 2024

(87) PCT Pub. No.: WO2023/190541
PCT Pub. Date: Oct. 5, 2023

(65) Prior Publication Data

US 2025/0046339 A1 Feb. 6, 2025

(30) Foreign Application Priority Data

Mar. 31, 2022 (JP) ................................ 2022-060881

(51) Int. Cl.
*G11B 5/78* (2006.01)
*G11B 5/008* (2006.01)
(Continued)

(52) U.S. Cl.
CPC ............ *G11B 5/78* (2013.01); *G11B 5/00813* (2013.01); *G11B 5/09* (2013.01); *G11B 5/70* (2013.01);
(Continued)

(58) Field of Classification Search
None
See application file for complete search history.

(56) References Cited

U.S. PATENT DOCUMENTS

2005/0254163 A1 11/2005 Nakao
2010/0323222 A1 12/2010 Nakashio
(Continued)

FOREIGN PATENT DOCUMENTS

JP H11096540 A 4/1999
JP 2004062979 A 2/2004
(Continued)

OTHER PUBLICATIONS

English Translation of JP 2020-166918 A (Year: 2020).*
(Continued)

*Primary Examiner* — Craig A. Renner
(74) *Attorney, Agent, or Firm* — K&L Gates LLP

(57) ABSTRACT

A magnetic recording medium is a tape-shaped magnetic recording medium and includes: a base; and a magnetic layer. The magnetic layer contains a conductive particle. An average thickness of the magnetic recording medium is 5.3 μm or less. An average number of conductive particles per 400 $\mu m^2$ of a surface of the magnetic layer is 50 or more, an average conductive particle area of the surface of the magnetic layer is 35000 $nm^2$ or less, and an average conductive particle area ratio on the surface of the magnetic layer is less than 2.00%.

15 Claims, 12 Drawing Sheets

B

(51) Int. Cl.

| | |
|---|---|
| ***G11B 5/09*** | (2006.01) |
| ***G11B 5/70*** | (2006.01) |
| ***G11B 5/706*** | (2006.01) |
| ***G11B 5/708*** | (2006.01) |
| ***G11B 5/714*** | (2006.01) |
| ***G11B 5/73*** | (2006.01) |
| ***G11B 5/84*** | (2006.01) |
| ***G11B 21/10*** | (2006.01) |
| ***G11B 23/037*** | (2006.01) |

(52) U.S. Cl.

CPC .......... *G11B 5/706* (2013.01); *G11B 5/70678* (2013.01); *G11B 5/708* (2013.01); *G11B 5/714* (2013.01); *G11B 5/73* (2013.01); *G11B 5/84* (2013.01); *G11B 21/10* (2013.01); *G11B 23/037* (2013.01)

(56) References Cited

U.S. PATENT DOCUMENTS

| | | | |
|---|---|---|---|
| 2015/0380037 | A1 | 12/2015 | Tamada et al. |
| 2021/0233565 | A1 | 7/2021 | Kasada et al. |

FOREIGN PATENT DOCUMENTS

| | | | |
|---|---|---|---|
| JP | 2005327386 | A | 11/2005 |
| JP | 2011028826 | A | 2/2011 |
| JP | 2016027518 | A | 2/2016 |
| JP | 2020166918 | A | 10/2020 |
| JP | 2021061080 | A | 4/2021 |
| JP | 2021118013 | A | 8/2021 |

OTHER PUBLICATIONS

English Translation of JP 2021-061080 A (Year: 2021).*

English Translation of Written Opinion of PCT/JP2023/012565 (Year: 2023).*

International Search Report from corresponding PCT application PCT/JP2023/012565, dated Jun. 20, 2023.

* cited by examiner

A

B

A

B

MAGNETIC RECORDING TAPE MEDIUM WITH CONDUCTIVE PARTICLE CONFIGURATION AND CARTRIDGE

TECHNICAL FIELD

The present disclosure relates to a magnetic recording medium and a cartridge including the same.

BACKGROUND ART

Tape-shaped magnetic recording media are widely used for archive purposes, including data centers. In tape-shaped magnetic recording media, a conductive particle is added to a magnetic layer in order to suppress charging of the tape surface and reduce dynamic friction during travelling. Patent Literature 1 describes the use of carbon black having a function of a solid lubricant as a conductive particle, and a minute protrusion is formed on the surface using carbon black.

CITATION LIST

Patent Literature

Patent Literature 1: Japanese Patent Application Laid-open No. 2004-062979

DISCLOSURE OF INVENTION

Technical Problem

However, even if a minute protrusion is formed on the surface of the magnetic layer using a conductive particle such as carbon black, the dynamic friction of the surface of the magnetic layer cannot be reduced in some cases. Further, depending on the state of the conductive particle such as carbon black present on the surface of the magnetic layer, electromagnetic conversion characteristics are reduced in some cases.

An object of the present disclosure is to provide a magnetic recording medium capable of reducing dynamic friction on a surface of a magnetic layer and achieving favorable electromagnetic conversion characteristics and a cartridge including the same.

Solution to Problem

In order to achieve the above-mentioned object, a magnetic recording medium according to the present disclosure is a tape-shaped magnetic recording medium, including:

a base; and a magnetic layer, the magnetic layer containing a conductive particle, an average thickness of the magnetic recording medium being 5.3 μm or less, an average number of conductive particles per 400 $\mu m^2$ of a surface of the magnetic layer being 50 or more, an average conductive particle area of the surface of the magnetic layer being 35000 $nm^2$ or less, an average conductive particle area ratio of the surface of the magnetic layer being less than 2.00%.

A cartridge according to the present disclosure includes the magnetic recording medium according to the present disclosure.

Figure 3:
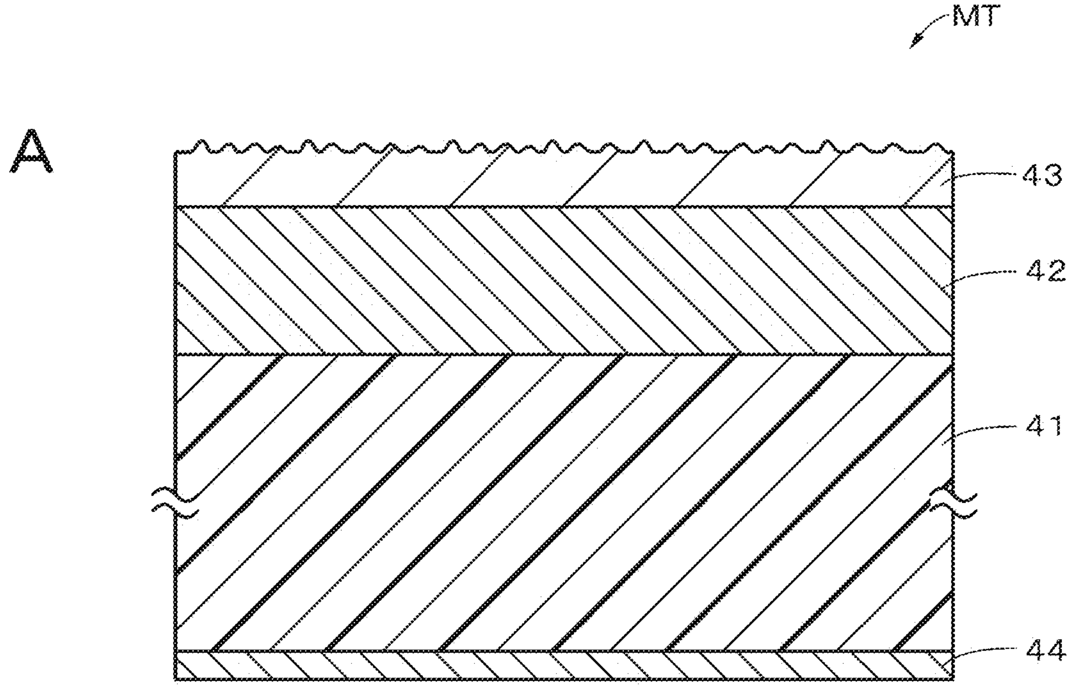
Figure 3:
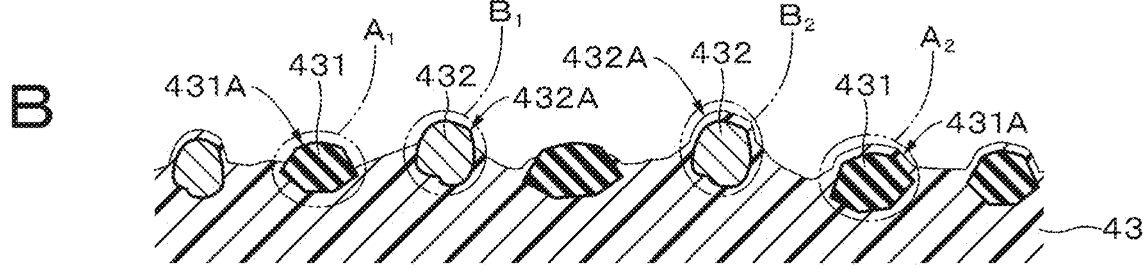

Part A of FIG. 3 is a cross-sectional view showing an example of a configuration of a magnetic tape. Part B of FIG. 3 is a cross-sectional view showing an example of a configuration of a surface of the magnetic layer.

Figure 4:
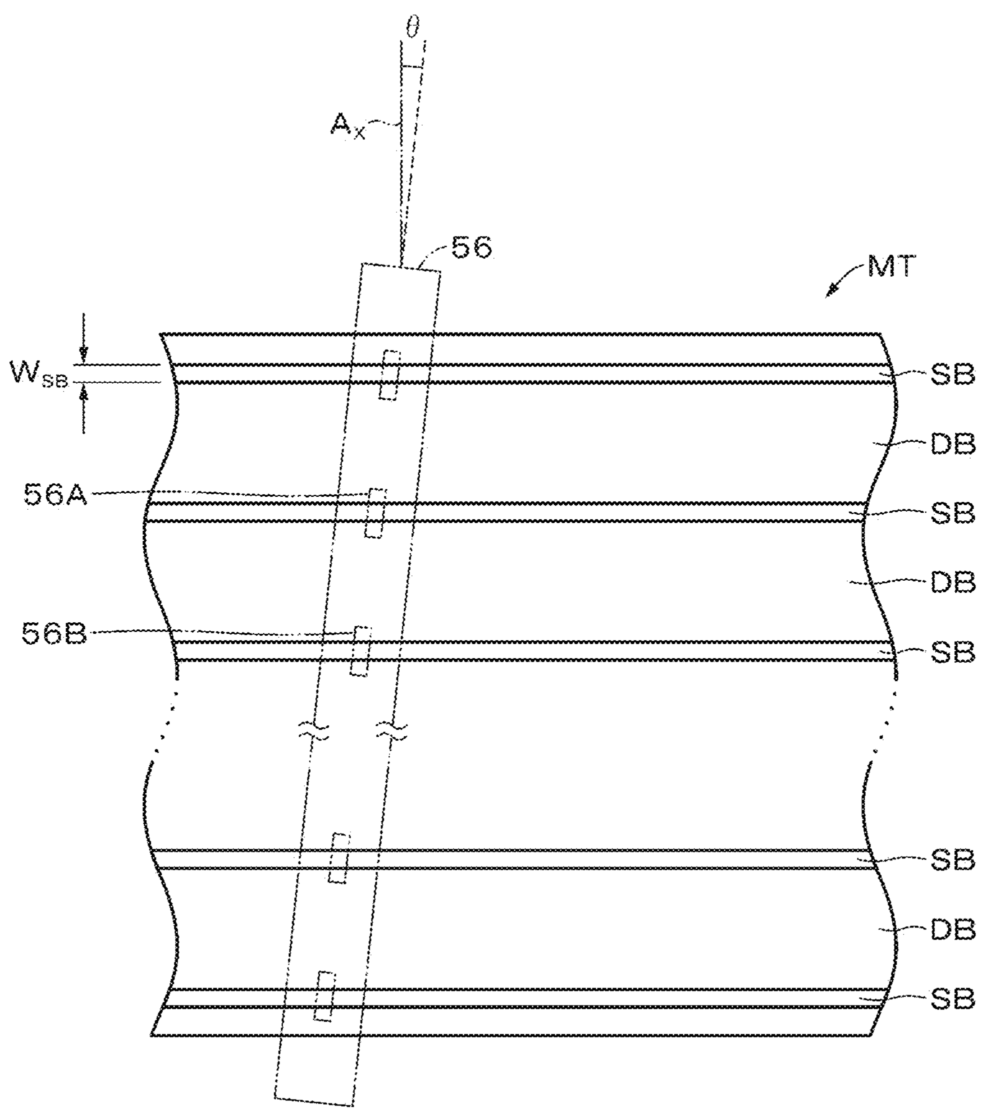

FIG. 4 is a schematic diagram showing an example of the layout of a data band and a servo band.

Figure 5:
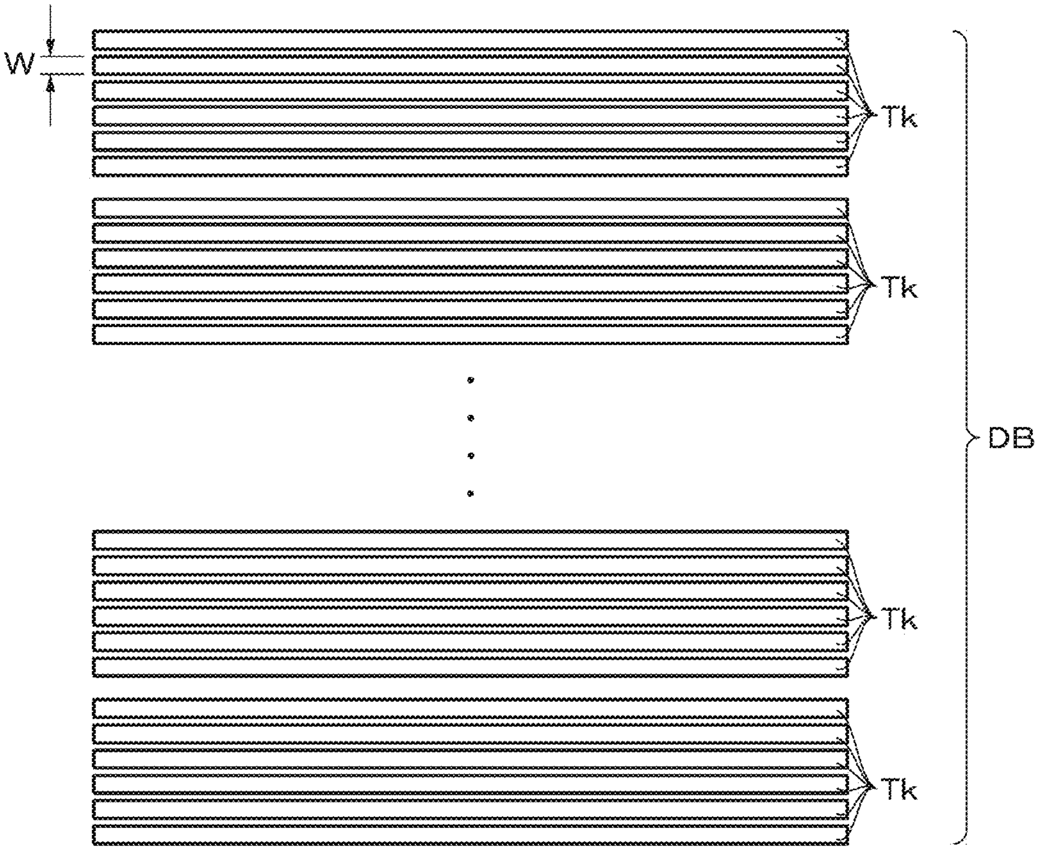

FIG. 5 is an enlarged view showing an example of a configuration of the data band.

Figure 6:
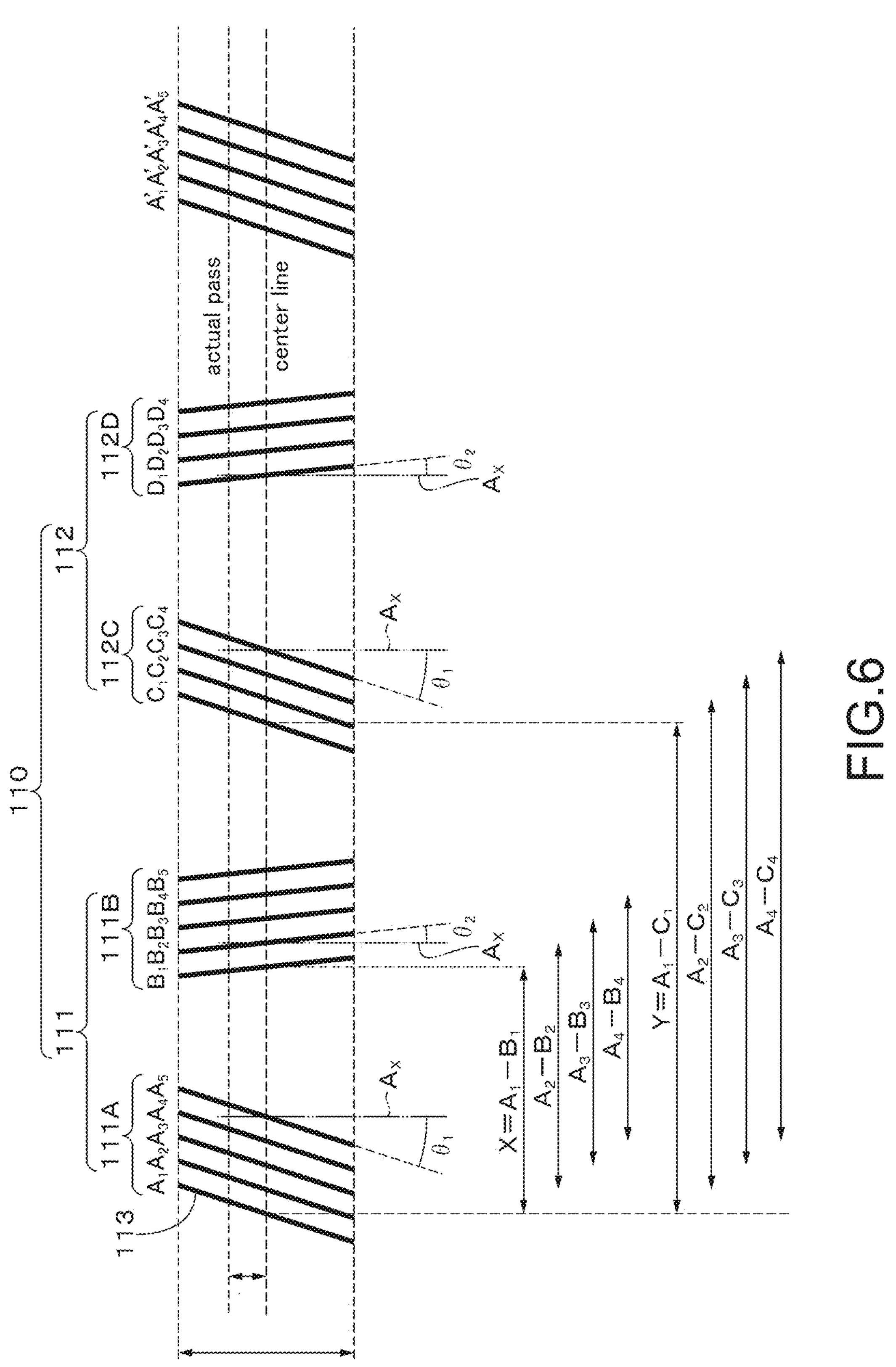

FIG. 6 is an enlarged view showing an example of a configuration of the servo band.

Figure 7:
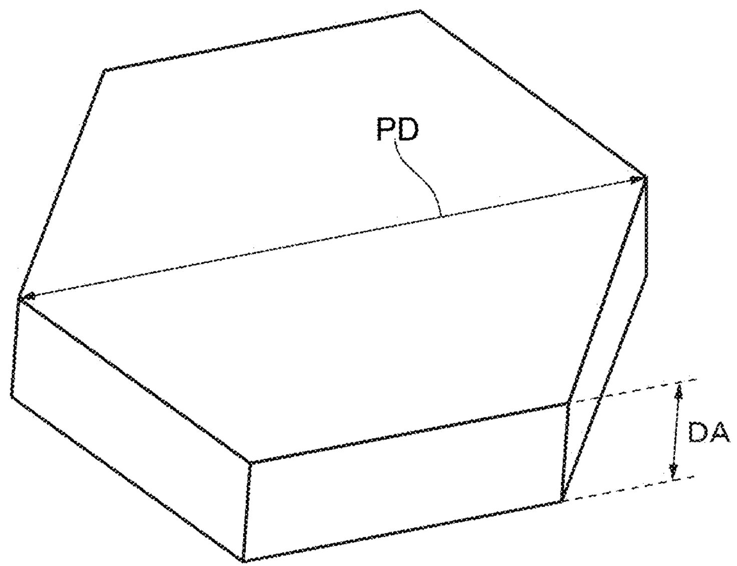

FIG. 7 is a perspective view showing an example of a shape of a particle.

Figure 8:
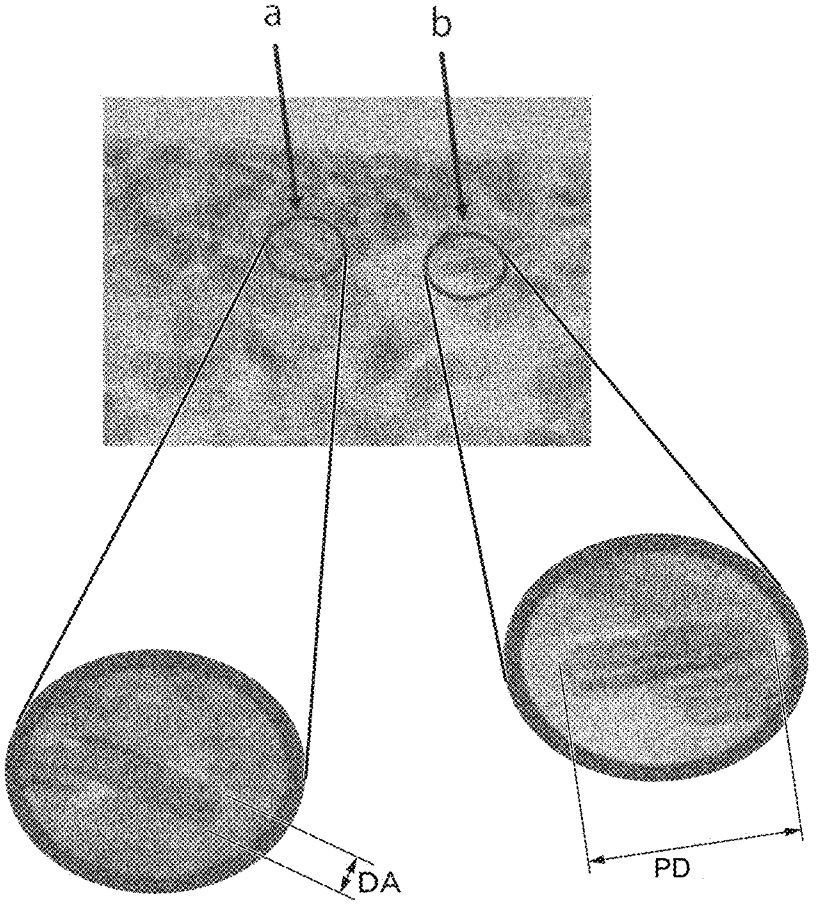

FIG. 8 is a diagram showing a first example of a cross-sectional TEM image of the magnetic layer.

Figure 9:
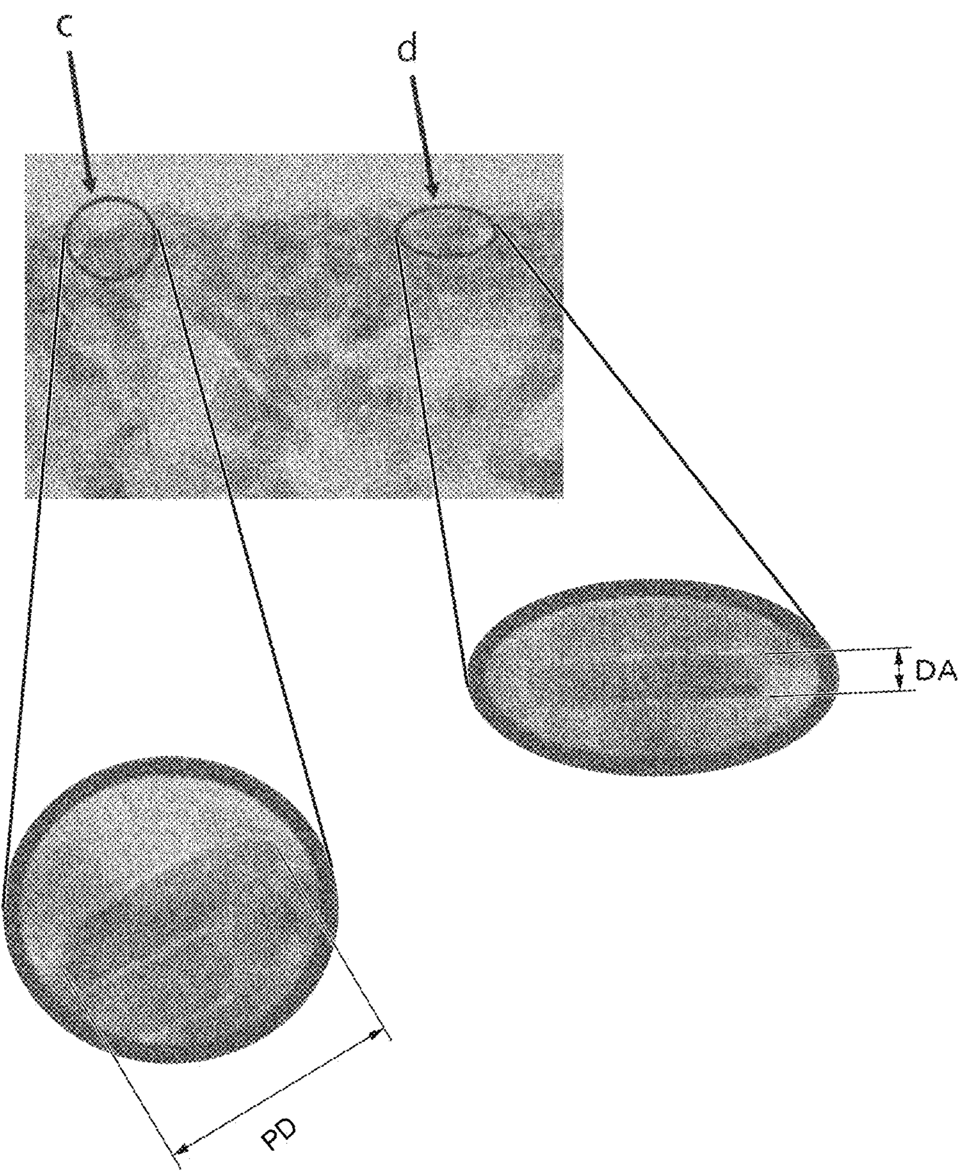

FIG. 9 is a diagram showing a second example of the cross-sectional TEM image of the magnetic layer.

Figure 10:
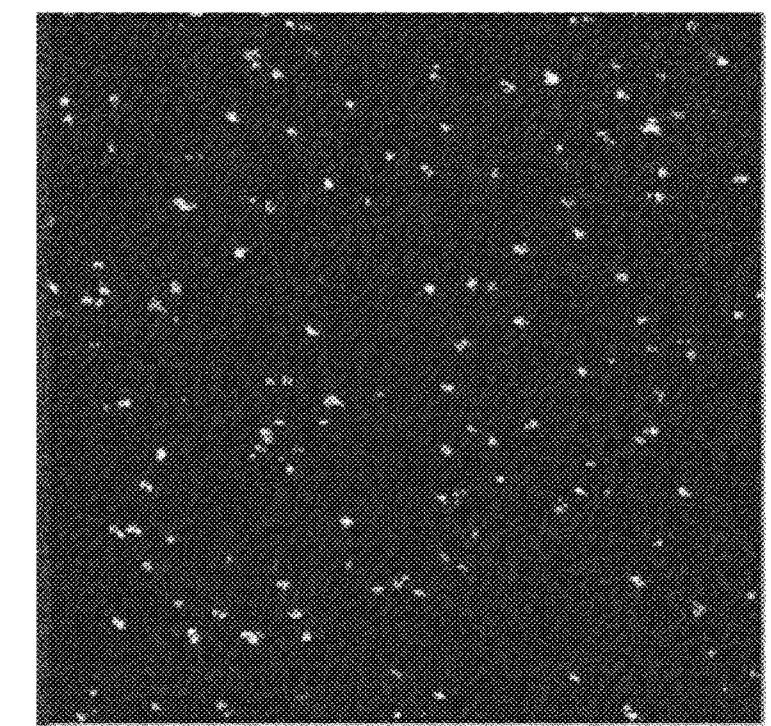
Figure 10:
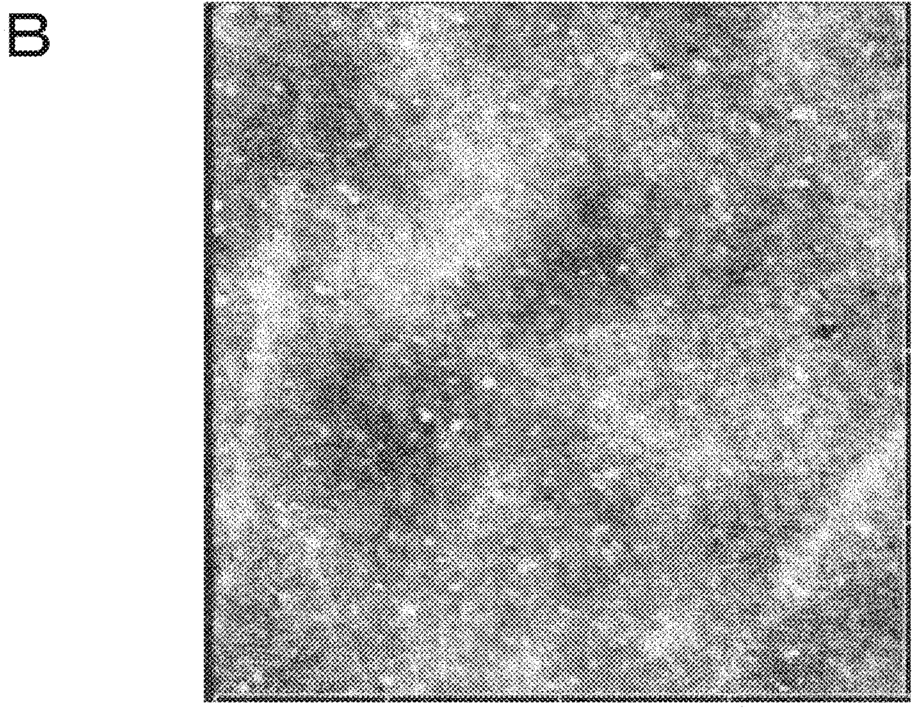

Part A of FIG. 10 is a diagram showing an example of the measurement result of an AFM current image. Part B of FIG. 10 is a diagram showing an example of the measurement result of an AFM shape image.

Figure 11:
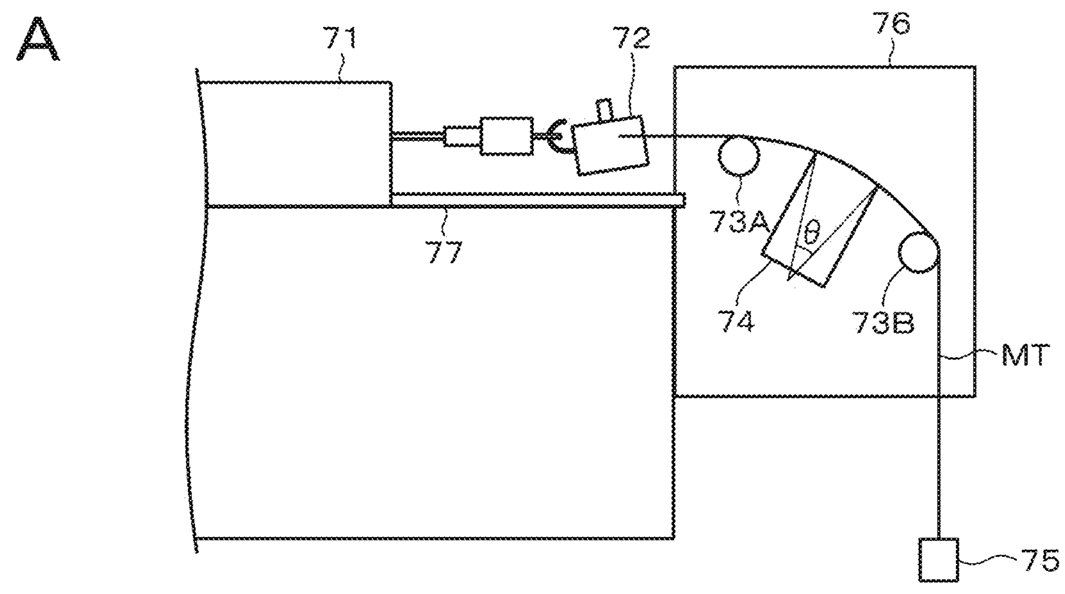
Figure 11:
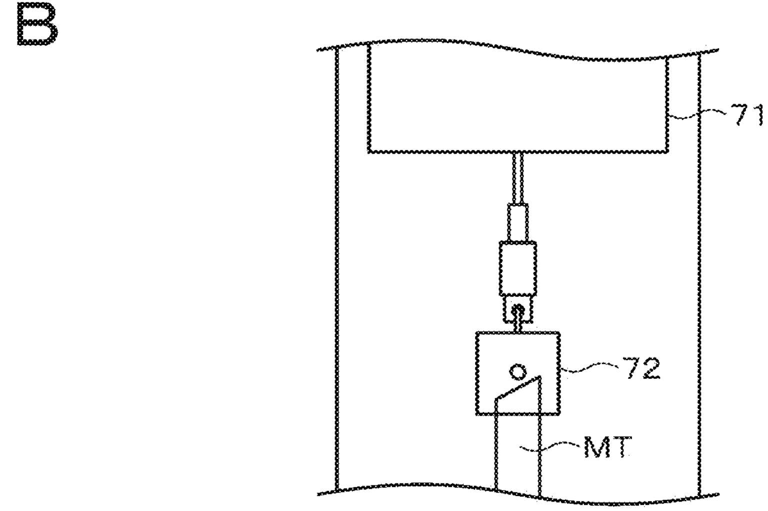

Part A of FIG. 11 and Part B of FIG. 11 are each a schematic diagram for describing a method of measuring a friction coefficient between the surface of the magnetic layer and a head.

Figure 12:
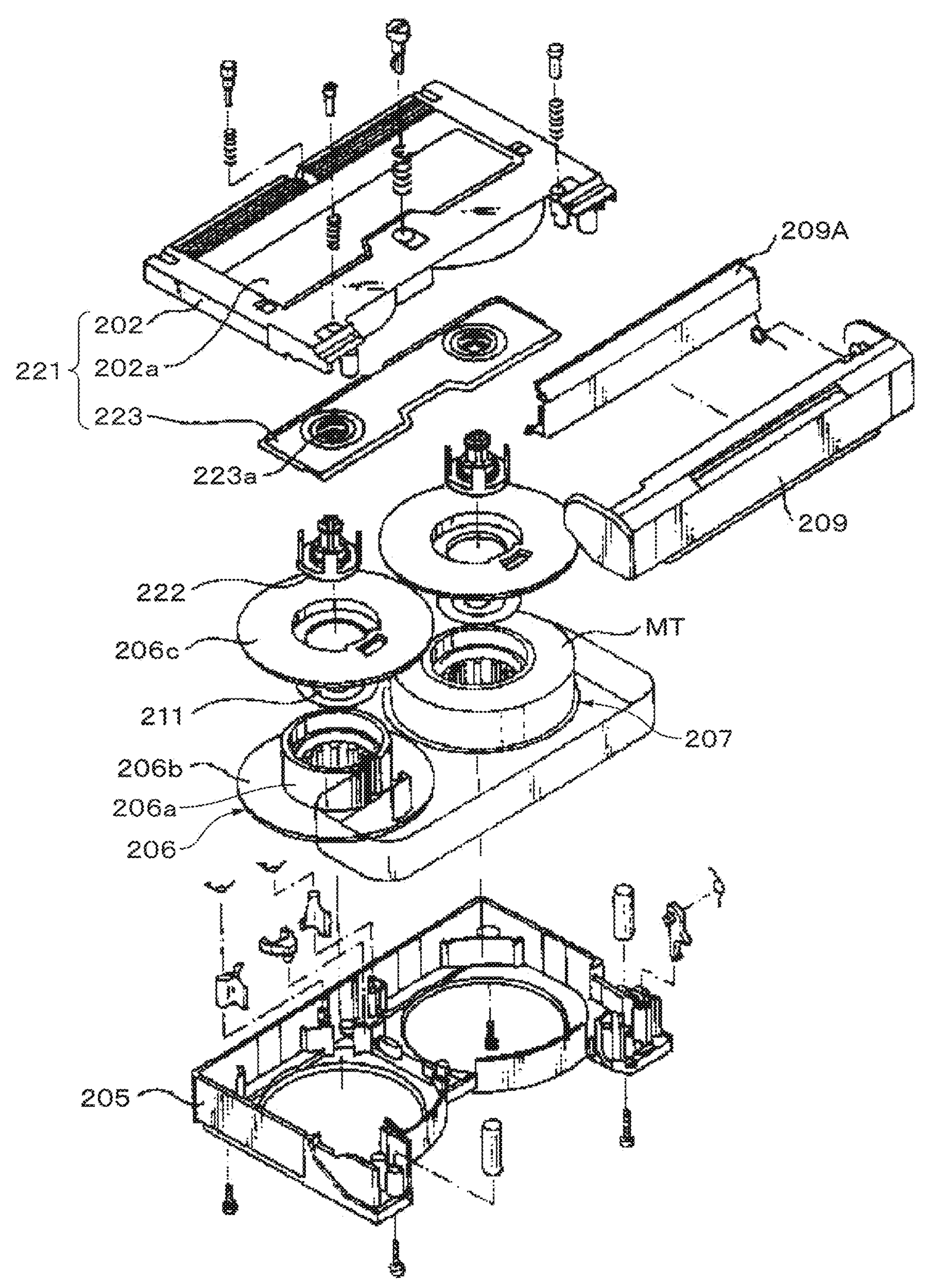

FIG. 12 is an exploded perspective view showing an example of a configuration of a cartridge according to a modified example of the embodiment of the present disclosure.

MODE(S) FOR CARRYING OUT THE INVENTION

An embodiment of the present disclosure will be described in the following order.

1 Configuration of cartridge

2 Configuration of cartridge memory

3 Configuration of magnetic tape

4 Method of producing magnetic tape

5 Operation and effect

6 Modified example

In the present specification, in the case where a measurement environment is not particularly described regarding description of a measurement method, the measurement is performed in an environment of 25° C.±2° C. and 50% RH±5% RH.

[1 Configuration of Cartridge]

Figure 1:
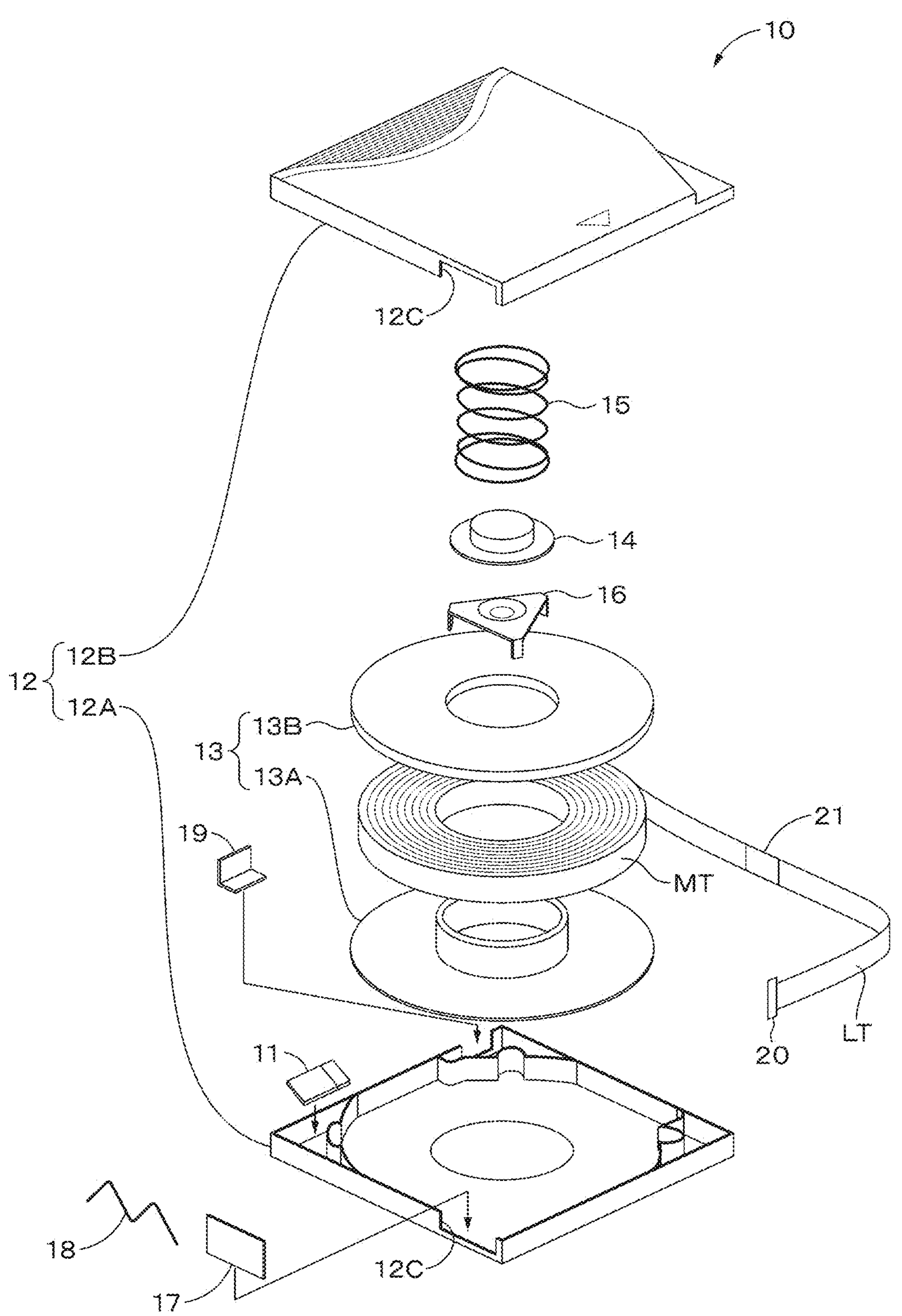
FIG. 1 is an exploded perspective view showing an example of a configuration of a cartridge according to an embodiment of the present disclosure.

FIG. 1 is an exploded perspective view showing an example of a configuration of a cartridge 10. The cartridge 10 is a one-reel type cartridge and includes, inside a cartridge case 12 including a lower shell 12A and an upper shell 12B, one reel 13 on which a tape-shaped magnetic recording medium (hereinafter, referred to as a "magnetic tape".) MT is wound, a reel lock 14 and a reel spring 15 for locking the rotation of the reel 13, a spider 16 for releasing the locked state of the reel 13, a slide door 17 for opening and closing a tape outlet 12C provided in the cartridge case 12 across the lower shell 12A and the upper shell 12B, a door spring 18 that biases the slide door 17 to the closed position of the tape outlet 12C, a write protector 19 for preventing accidental erasure, and the cartridge memory 11. The reel 13 for winding a magnetic tape MT has a substantially disk shape with an opening in the center and includes a reel hub 13A and a flange 13B formed of a hard material such as plastic. A leader tape LT is connected to an end portion of the magnetic tape MT on the outer periphery side. A leader pin 20 is provided at the tip of the leader tape LT.

The cartridge 10 may be a magnetic tape cartridge conforming to the LTO (Linear Tape-Open) standard or may be magnetic tape cartridge conforming to a standard other than the LTO standard.

The cartridge memory 11 is provided in the vicinity of one corner portion of the cartridge 10. When the cartridge 10 is loaded into a recording/reproduction apparatus, the cartridge memory 11 faces the reader/writer of the recording/reproduction apparatus. The cartridge memory 11 communicates with the recording/reproduction apparatus, specifically the reader/writer, using a wireless communication standard conforming to the LTO standard.

2 Configuration of Cartridge Memory

Figure 2:
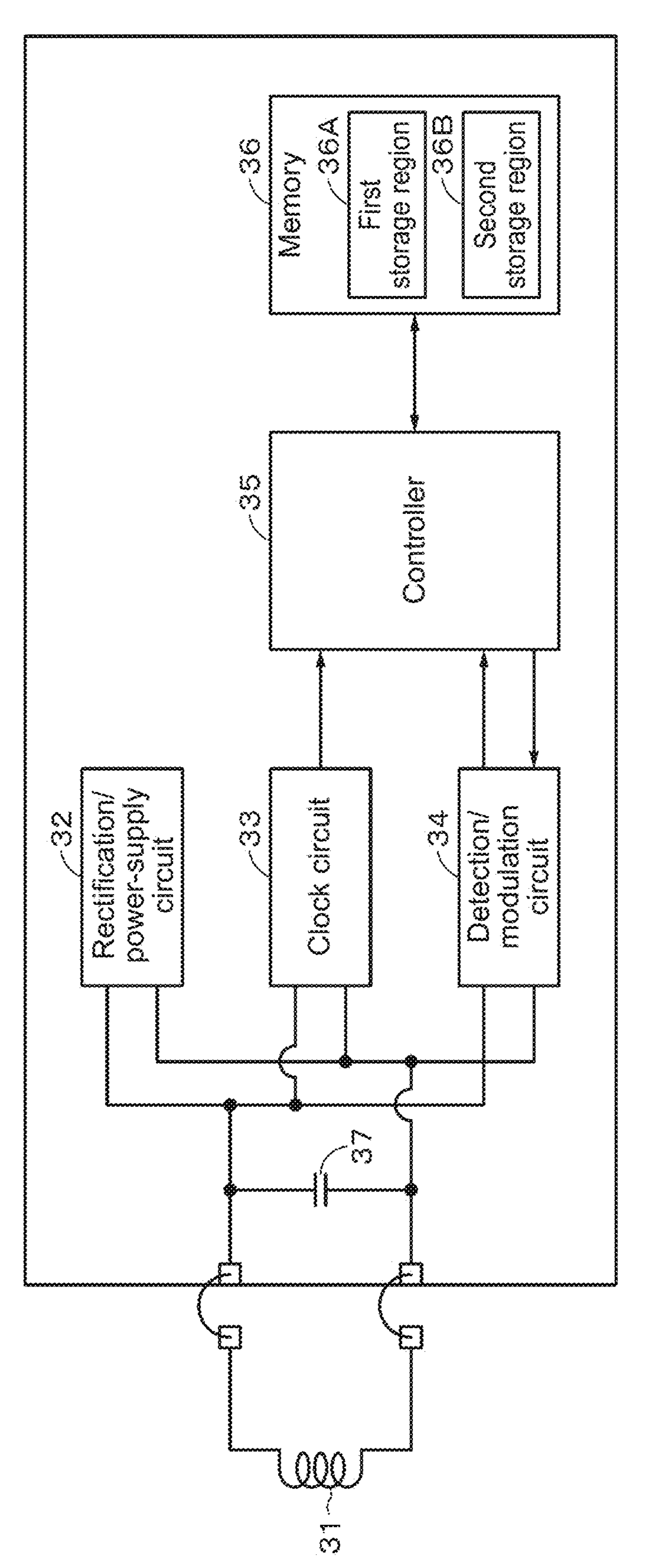
FIG. 2 is a block diagram showing an example of a configuration of a cartridge memory.

FIG. 2 is a block diagram showing an example of a configuration of the cartridge memory 11. The cartridge memory 11 includes an antenna coil (communication unit) 31 that communicates with a reader/writer using a predetermined communication standard, a rectification/power-supply circuit 32 that generates power from radio waves received by the antenna coil 31 using an induced electromotive force and rectifies the power to generate power supply, a clock circuit 33 that generates a clock from radio waves received by the antenna coil 31 using an induced electromotive force similarly, a detection/modulation circuit 34 that detects radio waves received by the antenna coil 31 and modulates signals to be transmitted by the antenna coil 31, a controller (control unit) 35 that includes a logic circuit or the like for determining and processing a command and data from a digital signal extracted from the detection/modulation circuit 34, and a memory (storage unit) 36 that stores information. Further, the cartridge memory 11 includes a capacitor 37 connected in parallel to the antenna coil 31, and the antenna coil 31 and the capacitor 37 constitute a resonant circuit.

The memory 36 stores information relating to the cartridge 10, and the like. The memory 36 is a non-volatile memory (NVM). The memory capacity of the memory 36 is favorably approximately 32 KB or more.

The memory 36 may have a first storage region 36A and a second storage region 36B. The first storage region 36A corresponds to, for example, the storage region of the cartridge memory in a magnetic tape standard before a predetermined generation (e.g., the LTO standard before LTO8) and is a region for storing information conforming to the magnetic tape standard before the predetermined generation. The information conforming to the magnetic tape standard before the predetermined generation is, for example, manufacturing information (e.g., the unique number of the cartridge 10) or a usage history (e.g., the number of times the tape has been pulled out (Thread Count)).

The second storage region 36B corresponds to the expanded storage region for the storage region of the cartridge memory in the magnetic tape standard before the predetermined generation (e.g., the LTO standard before LTO8). The second storage region 36B is a region for storing additional information. Here, the additional information means, for example, information relating to the cartridge 10, which is not specified in the magnetic tape standard before the predetermined generation (e.g., the LTO standard before LTO8). The additional information includes, for example, at least one type of information selected from the group consisting of tension adjustment information, management ledger data, Index information, and thumbnail information, but is not limited these pieces of data. The tension adjustment information is information for adjusting the tension applied in the longitudinal direction of the magnetic tape MT. The tension adjustment information includes, for example, at least one type of information selected from the group consisting of information obtained by intermittently measuring the width between servo bands in the longitudinal direction of the magnetic tape MT, tension information of a drive, and information regarding the temperature and humidity of the drive. These pieces of information are managed in conjunction with information regarding the usage status of the cartridge 10 in some cases. The tension adjustment information is favorably obtained when data is recorded on the magnetic tape MT or before data is recorded. The information of the drive means information regarding the tension applied in the longitudinal direction of the magnetic tape MT.

The management ledger data is data that includes at least one selected from the group consisting of the capacity, creation date, editing date, and storage location of the data file recorded on the magnetic tape MT. The Index information includes metadata for searching for the content of the data file, or the like. The thumbnail information includes the thumbnail of a moving image or a still image stored in the magnetic tape MT.

The memory 36 may include a plurality of banks. In this case, some of the plurality of banks may form the first storage region 36A and the remaining banks may form the second storage region 36B.

The antenna coil 31 induces an induced voltage by electromagnetic induction. The controller 35 communicates with a recording/reproduction apparatus in accordance with the predetermined communication standard via the antenna coil 31. Specifically, for example, mutual authentication, transmission/reception of a command, data exchange, or the like is performed.

The controller 35 stores information received from the recording/reproduction apparatus via the antenna coil 31 in the memory 36. For example, tension adjustment information received from the recording/reproduction apparatus via the antenna coil 31 is stored in the second storage region 36B of the memory 36. The controller 35 reads information from the memory 36 in accordance with a request from the recording/reproduction apparatus, and transmits the read information to the recording/reproduction apparatus via the antenna coil 31. For example, in accordance with a request from the recording/reproduction apparatus, tension adjustment information is read from the second storage region 36B of the memory 36, and the read tension adjustment information is transmitted to the recording/reproduction apparatus via the antenna coil 31.

3 Configuration of Magnetic Tape

Part A of FIG. 3 is a cross-sectional view showing an example of a configuration of the magnetic tape MT. The magnetic tape MT includes a long base 41, an underlayer 42 provided on one main surface (first main surface) of the base 41, a magnetic layer 43 provided on the underlayer 42, and a back layer 44 provided on the other main surface (second main surface) of the base 41. Note that the underlayer 42 and the back layer 44 are provided as necessary and may be omitted. The magnetic tape MT may be a perpendicular recording magnetic recording medium or a longitudinal recording magnetic recording medium. From the viewpoint of improving travelling performance, the magnetic tape MT favorably contains a lubricant. The lubricant may be contained in at least one of the underlayer 42 and the magnetic layer 43.

The magnetic tape MT may be one conforming to the LTO standard or may be one conforming to a standard other than the LTO standard. The width of the magnetic tape MT may be ½ inch or may be wider than ½ inch. In the case where the magnetic tape MT conforms to the LTO standard, the width of the magnetic tape MT is ½ inch. The magnetic tape MT may have a configuration in which the width of the magnetic tape MT can be kept constant or substantially constant by adjusting the tension applied in the longitudinal direction of the magnetic tape MT during travelling by the recording/reproduction apparatus (drive).

The magnetic tape MT has a long shape and is caused to travel in the longitudinal direction during recording and reproduction. The magnetic tape MT is favorably used in a recording/reproduction apparatus that includes a ring-type head as a recording head. The magnetic tape MT is favorably used in a recording/reproduction apparatus that is configured to be capable of recording data with a data track width of 1200 nm or less or 1000 nm or less.

The magnetic tape MT is favorably reproduced by a reproduction head using a TMR element. The signal to be reproduced by the reproduction head using TMR may be data recorded in a data band DB (see FIG. 4) or a servo pattern (servo signal) recorded in the servo band SB (see FIG. 4).

(Base)

The base 41 is a non-magnetic support that supports the underlayer 42 and the magnetic layer 43. The base 41 has a long film shape. The upper limit value of the average thickness of the base 41 is favorably 4.4 μm or less, more favorably 4.2 μm or less, still more favorably 4.0 μm or less, particularly favorably 3.8 μm or less, and most favorably 3.4 μm or less. When the upper limit value of the average thickness of the base 41 is 4.4 μm or less, it is possible to increase the recording capacity of one data cartridge to be more than that of a general magnetic tape. The lower limit value of the average thickness of the base 41 is favorably 3.0 μm or more, more favorably 3.2 μm or more. When the lower limit value of the average thickness of the base 41 is 3.0 μm or more, it is possible to suppress a decrease in the strength of the base 41.

The average thickness of the base 41 is obtained as follows. First, the magnetic tape MT housed in the cartridge 10 is unwound, and the magnetic tape MT is cut into a length of 250 mm at a position 30 m to 40 m in the longitudinal direction from a connection part 21 between the magnetic tape MT and the leader tape LT to prepare a sample. In the present specification, the "longitudinal direction" in the "longitudinal direction from the connection part 21 between the magnetic tape MT and the leader tape LT" means the direction from one end on the side of the leader tape LT to the other end on the side opposite thereto.

Subsequently, the layers other than the base 41 of the sample (i.e., the underlayer 42, the magnetic layer 43, and the back layer 44) are removed with a solvent such as MEK (methyl ethyl ketone) and dilute hydrochloric acid. Next, the thickness of the sample (base 41) is measured at five positions using a Laser Hologage (LGH-110C) manufactured by Mitutoyo Corporation as a measuring apparatus, and the measured values are simply averaged (arithmetically averaged) to calculate the average thickness of the base 41. Note that the above five measurement positions are randomly selected from the sample such that they are different positions in the longitudinal direction of the magnetic tape MT.

The base 41 contains, for example, a polyester as a main component. The polyester includes, for example, at least one selected from the group consisting of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p(oxybenzoate), and polyethylene bisphenoxycarboxylate. In the case where the base 41 contains two or more types of polyesters, the two or more types of polyesters may be mixed, copolymerized, or stacked. At least one of an end or a side chain of the polyester may be modified. The base 41 may contain a resin described below other than polyesters, in addition to the polyester.

In the present specification, the "main component" means the component with the highest content ratio, of the components forming the base 41. For example, in the case where the main component of the base 41 is a polyester, the content ratio of the polyester in the base 41 may be, for example, 50 mass % or more, 60 mass % or more, 70 mass % or more, 80 mass % or more, 90 mass % or more, 95 mass % or more, or 98 mass % or more with respect to the mass of the base 41, or the base 41 may contain only the polyester.

The fact that the base 41 contains a polyester is confirmed, for example, as follows. First, as in the method of measuring the average thickness of the base 41, the magnetic tape MT is prepared and cut into a length of 250 mm to prepare a sample, and then, the layers of the sample other than the base 41 are removed. Next, an IR spectrum of the sample (base 41) is obtained by infrared absorption spectrometry (IR). On the basis of this IR spectrum, it can be confirmed that the base 41 contains a polyester.

The base 41 favorably contains a polyester. When the base 41 contains a polyester, the Young's modulus in the longitudinal direction of the base 41 can be reduced to favorably 2.5 GPa or more and 7.8 GPa or less, more favorably 3.0 GPa or more and 7.0 GPa or less. Therefore, by adjusting the tension in the longitudinal direction of the magnetic tape MT during travelling using the recording/reproduction apparatus, the width of the magnetic tape MT can be kept constant or substantially constant. The method of measuring the Young's modulus in the longitudinal direction of the base 41 will be described below.

The base 41 may contain a resin other than polyesters. In this case, the resin other than polyesters may be the main component of the material forming the base 41. In the case where the resin other than polyesters is the main component of the material forming the base 41, the content ratio of the resin other than polyesters in the base 41 may be, for example, 50 mass % or more, 60 mass % or more, 70 mass % or more, 80 mass % or more, 90 mass % or more, 95 mass % or more, or 98 mass % or more with respect to the mass of the base 41, or the base 41 may contain only a resin other than polyesters. The resin other than polyesters includes, for example, at least one selected from the group consisting of a polyolefin resin, a cellulose derivative, a vinyl resin, and a different polymer resin. In the case where the base 41 contains two or more of these resins, the two or more resins may be mixed, copolymerized, or stacked.

The polyolefin resin includes, for example, at least one selected from the group consisting of PE (polyethylene) and PP (polypropylene). The cellulose derivative includes, for example, at least one selected from the group consisting of cellulose diacetate, cellulose triacetate, CAB (cellulose acetate butyrate), and CAP (cellulose acetate propionate). The vinyl resin includes, for example, at least one selected from the group consisting of PVC (polyvinyl chloride) and PVDC (polyvinylidene chloride).

The different polymer resin includes, for example, at least one selected from the group consisting of PEEK (polyetheretherketone), PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, e.g., Zylon (registered trademark)), polyether, PEK (polyetherketone), polyetherester, PES (polyethersulfone), PEI (polyetherimide), PSF (polysulfone), PPS (polyphenylene sulfide), PC (polycarbonate), PAR (polyarylate), and PU (polyurethane). Specifically, for example, the base 41 may contain, as a main component, PEEK (polyetheretherketone), PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, e.g., Zylon (registered trademark)), polyether, PEK (polyetherketone), polyetherester, PES (polyethersulfone), PEI (polyetherimide), PSF (polysulfone), PPS (polyphenylene sulfide), PC (polycarbonate), PAR (polyarylate), or PU (polyurethane).

The base 41 may be biaxially stretched in the longitudinal direction and the width direction. The polymer resin contained in the base 41 is favorably oriented in a direction oblique to the width direction of the base 41.

(Magnetic Layer)

The magnetic layer 43 is configured to be capable of recording signals by a magnetization pattern. The magnetic layer 43 may be a recording layer of a perpendicular recording type or a recording layer of a longitudinal recording type. The magnetic layer 43 includes a magnetic particle, a conductive particle, and a binder. The magnetic layer 43 may further include an abrasive particle. The magnetic layer 43 may further include at least one additive selected from the group consisting of a lubricant, a curing agent, a rust inhibitor, and non-magnetic reinforcing particles, as necessary.

Part B of FIG. 3 is a cross-sectional view showing an example of a configuration of a surface of the magnetic layer 43 (hereinafter, referred to as a "magnetic surface" in some cases). The magnetic layer 43 favorably includes a plurality of first protrusions 431A on the magnetic surface. The first protrusion 431A is formed by a conductive particle 431 protruding from the magnetic surface. The conductive particle 431 may be one of a primary particle and a secondary particle. The plurality of first protrusions 431A favorably includes a plurality of protrusions (in Part B of FIG. 3, see the first protrusion 431A surrounded by a two-dot chain line $A_1$) in which part of the conductive particle 431 is exposed without being covered with a binder. The conductive particle 431 that is partially exposed without being covered with a binder as described above is capable of functioning as a solid lubricant during recording or reproduction of the magnetic tape MT. The plurality of first protrusions 431A may include a plurality of protrusions (in Part B of FIG. 3, see the first protrusion 431A surrounded by a two-dot chain line $A_2$) in which the entire conductive particle 431 is covered with a binder.

The magnetic layer 43 favorably further includes a plurality of second protrusions 432A on the magnetic surface. The second protrusion 432A is formed by an abrasive particle 432 protruding from the magnetic surface. The abrasive particle 432 may be one of a primary particle and a secondary particle. The plurality of second protrusions 432A includes one or both of a plurality of protrusions (in Part B of FIG. 3, see the second protrusion 432A surrounded by a two-dot chain line $B_1$) in which part of the abrasive particle 432 is exposed without being covered with a binder and a plurality of protrusions (in Part B of FIG. 3, see the second protrusion 432A surrounded by a two-dot chain line $B_2$) in which the entire abrasive particle 432 is covered with a binder.

As shown in FIG. 4, the magnetic layer 43 may include a plurality of servo bands SB and a plurality of data bands DB in advance. The plurality of servo bands SB is provided at equal intervals in the width direction of the magnetic tape MT. The data band DB is provided between the servo bands SB adjacent to each other. The servo band SB is for guiding a head unit (magnetic head) 56 (specifically, servo read heads 56A and 56B) during recording or reproducing data. A servo pattern (servo signal) for tracking control of the head unit 56 is written to the servo band SB in advance. User data is recorded in the data band DB.

In order to read asymmetric servo stripes 113 (see FIG. 6) described below, the head unit 56 may be configured such that it can be kept inclined with respect to an axis $A_x$ parallel to the width direction of the magnetic tape MT during recording and reproduction of data, as shown in FIG. 4. Alternatively, the head unit 56 may be configured to be inclined with respect to the above axis $A_x$ in accordance with the meandering or deformation of the magnetic tape MT during recording and reproduction of data. The inclination angle θ of the head unit 56 with reference to the axis $A_x$ parallel to the width direction of the magnetic tape MT is favorably 3° or more and 18° or less, more favorably 5° or more and 15° or less.

The upper limit value of a ratio $R_S$ (=($S_{SB}$/S)×100) of a total area $S_{SB}$ of the plurality of servo bands SB to the area S of the magnetic surface (surface of the magnetic layer 43) is favorably 4.0% or less, more favorably 3.5% or less, and still more favorably 3.0% or less, from the viewpoint of achieving high recording capacity. Meanwhile, the lower limit value of the ratio $R_S$ of the total area $S_{SB}$ of the plurality of servo bands SB to the area S of the magnetic surface is favorably 1.0% or more from the viewpoint of providing five or more servo bands SB.

The ratio $R_S$ of the total area $S_{SB}$ of the plurality of servo bands SB to the area S of the entire magnetic surface is obtained as follows. The magnetic tape MT is developed using a ferricolloid developer (Sigmarker Q manufactured by Sigma Hi-Chemical Inc.), and then the developed magnetic tape MT is observed under an optical microscope to measure a servo band width $W_{SB}$ and the number of servo bands SB. Next, the ratio $R_S$ is obtained using the following formula.

$$\text{Ratio } R_S[\%] = \big(((\text{servo band width } W_{SB}) \times (\text{number of servo bands } SB))/(\text{width of the magnetic tape } MT)\big) \times 100$$

The number of servo bands SB is, for example, 5+4n (where n represents an integer equal to or greater than 0). The number of servo bands SB is favorably 5 or more, more favorably 9 or more. When the number of servo bands SB is 5 or more, it is possible to prevent the dimensional change in the width direction of the magnetic tape MT from affecting the servo signal, and achieve stable recording and reproduction properties with less off-track. The upper limit value of the number of servo bands SB is not particularly limited, but is, for example, 33 or less.

The number of servo bands SB is obtained in the same manner as the above method of calculating the ratio $R_S$.

The upper limit value of the servo band width $W_{SB}$ is favorably 95 μm or less, more favorably 65 μm or less, and still more favorably 50 μm or less from the viewpoint of achieving high recording capacity. The lower limit value of the servo band width $W_{SB}$ is favorably 10 μm or more. It is difficult to produce a magnetic head that is capable of reading a servo signal with the servo band width $W_{SB}$ of less than 10 μm.

The width of the servo band width $W_{SB}$ is obtained in the same manner as the above method of calculating the ratio $R_S$.

As shown in FIG. 5, the magnetic layer 43 is configured such that a plurality of data tracks Tk can be formed in the data band DB. The upper limit value of a data track width W is favorably 1200 nm or less, 1000 nm or less, or 800 nm or less, and particularly favorably 600 nm or less from the viewpoint of improving track recording density and achieving high recording capacity. The lower limit value of the data track width W is favorably 20 nm or more considering the size of magnetic particles.

The data track width W is obtained as follows. First, the cartridge 10 with data recorded on the entire surface of the magnetic tape MT is prepared, the magnetic tape MT is unwound from this cartridge 10, and the magnetic tape MT is cut into a length of 250 mm at a position 30 m to 40 m in the longitudinal direction from the connection part 21 between the magnetic tape MT and the leader tape LT to prepare a sample. Subsequently, the data recording pattern of the data band DB portion of the magnetic layer 43 of the sample is observed using a magnetic force microscope (MFM) to obtain an MFM image. Dimension 3100 manufactured by Digital Instruments and the analysis software thereof are used as the MFM. The measurement region of the MFM image is 10 μm×10 μm, and the measurement region of 10 μm×10 μm is divided into 512×512 (=262,144) measurement points. The measurement by MFM is performed on three 10 μm×10 μm measurement regions with different locations, i.e. three MFM images are obtained. The track widths are measured at 10 locations in each of the three obtained MFM images to obtain measured values at a total of 30 locations, and the average value of the measured values at the 30 locations (which is a simple average) is calculated. The obtained average value is the data track width W. The analysis software attached to Dimension 3100 is used to measure the track width. Note that the measurement conditions of the above MFM are as follows: sweep rate: 1 Hz, chip used: MFMR-20, lift height: 20 nm, and correction: Flatten order 3.

From the viewpoint of achieving high recording capacity, the magnetic layer 43 is configured to be capable of recording data such that a minimum value L of a distance between magnetization reversals is favorably 47 nm or less, more favorably 44 nm or less, still more favorably 42 nm or less, and particularly favorably 40 nm or less. The lower limit value of the minimum value L of the distance between magnetization reversals is favorably 20 nm or more considering the size of magnetic particles.

The minimum value L of the distance between magnetization reversals is obtained as follows. First, a sample is prepared in the same manner as in the method of measuring the data track width W. Subsequently, the data recording pattern of the data band DB portion of the magnetic layer 43 of the sample is observed using a magnetic force microscope (MFM) to obtain an MFM image. Dimension 3100 manufactured by Digital Instruments and the analysis software thereof are used as the MFM. The measurement region of the MFM image is 2 μm×2 μm, and the measurement region of 2 μm×2 μm is divided into 512×512 (=262,144) measurement points. The measurement by MFM is performed on three 2 μm×2 μm measurement regions with different locations, i.e. three MFM images are obtained. Fifty bit-to-bit distances are measured from the two-dimensional uneven chart of the recording pattern of the obtained MFM image. The bit-to-bit distances are measured using the analysis software attached to Dimension 3100. The value that becomes approximately the greatest common divisor of the measured 50 bit-to-bit distances is defined as the minimum value L of the distance between magnetization reversals. Note that the measurement conditions are as follows: sweep rate: 1 Hz, chip used: MFMR-20, lift height: 20 nm, and correction: Flatten order 3.

A bit length $L_{bit}$ of the signal recorded in the data band DB is favorably 47 nm or less or 46 nm or less, more favorably 44 nm or less, still more favorably 42 nm or less, and particularly favorably 40 nm or less from the viewpoint of improving the recording density of the magnetic tape MT.

The bit length $L_{bit}$ of the signal recorded in the data band DB is obtained in the same manner as in the method of measuring the minimum value L of the distance between magnetization reversals.

The bit area of the signal recorded in the data band DB is favorably 53000 $nm^2$ or less, more favorably 45000 $nm^2$ or less, still more favorably 37000 $nm^2$ or less, and particularly favorably 30000 $nm^2$ or less from the viewpoint of improving the recording density of the magnetic tape MT.

The bit area of the signal recorded in the data band DB is obtained as follows. First, three MFM images are obtained in the same manner as in the method of measuring the data track width W. Next, the data track width W and the bit length $L_{bit}$ are obtained in the same manner as the method of measuring the data track width W and the method of measuring the bit length $L_{bit}$. Next, the bit area ($W \times L_{bit}$) of the signal recorded in the data band DB is obtained using the data track width W and the bit length $L_{bit}$.

The servo pattern is a magnetized region and is formed by magnetizing a specific region of the magnetic layer 43 in a specific direction by a servo write head during production of a magnetic tape. Of the servo band SB, a region in which the servo pattern is not formed (hereinafter, referred to as a "non-pattern region") may be a magnetized region in which the magnetic layer 43 is magnetized or a non-magnetized region in which the magnetic layer 43 is not magnetized. In the case where the non-pattern region is a magnetized region, the servo pattern forming region and the non-pattern region are magnetized in different directions (e.g., opposite directions).

In the LTO standard, as shown in FIG. 6, a servo pattern that includes a plurality of servo stripes (linear magnetized regions) 113 inclined with respect to the axis Ax parallel to the width direction of the magnetic tape MT is formed in the servo band SB.

The servo band SB includes a plurality of servo frames 110. Each servo frame 110 includes 18 servo stripes 113. Specifically, each servo frame 110 includes a servo subframe 1 (111) and a servo subframe 2 (112).

The servo subframe 1 (111) includes an A burst 111A and a B burst 111B. The B burst 111B is disposed adjacent to the A burst 111A. The A burst 111A includes five servo stripes 113 formed at predetermined intervals and inclined at a predetermined angle $\theta_1$ with respect to the axis Ax parallel to the width direction of the magnetic tape MT. In FIG. 6, these five servo stripes 113 are denoted by reference symbols $A_1$, $A_2$, $A_3$, $A_4$, and $A_5$ from the EOT (End Of Tape) to the BOT (Beginning Of Tape) of the magnetic tape MT.

The B burst 111B includes five servo stripes 113 formed at predetermined intervals and inclined at a predetermined angle $\theta_2$ with respect to the axis Ax parallel to the width direction of the magnetic tape MT. In FIG. 6, these five servo stripes 113 are denoted by reference symbols $B_1$, $B_2$, $B_3$, $B_4$, and $B_5$ from the EOT to the BOT of the magnetic tape MT.

The servo stripes 113 of the B burst 111B are inclined in the opposite direction to the servo stripes 113 of the A burst 111A. The servo stripes 113 of the A burst 111A and the servo stripes 113 of the B burst 111B are asymmetric with respect to the axis Ax parallel to the width direction of the magnetic tape MT. That is, the servo stripes 113 of the A burst 111A and the servo stripes 113 of the B burst 111B are disposed in a substantially inverted V-shape. Since the servo stripes 113 of the A burst 111A and the servo stripes 113 of the B burst 111B are asymmetric with respect to the axis Ax, there is a state in which the servo stripes 113 of the A burst 111A and the servo stripes 113 of the B burst 111B are substantially symmetric with respect to the central axis of the sliding surface of the head unit 56 when the head unit 56 is inclined with respect to the axis Ax. By changing the inclination of the head unit 56 with reference to this state, it is possible to adjust the distance between the servo read heads 56A and 56B in the width direction of the magnetic tape MT. Therefore, in both cases where the width of the magnetic tape MT is widened and where the width of the magnetic tape MT is narrowed, it is possible to cause the servo read heads 56A and 56B to face predetermined positions of the servo band SB. Note that the central axis of the sliding surface of the head unit 56 means an axis that passes through the center of the plurality of servo read heads 56A and 56B on the sliding surface of the head unit 56.

The predetermined angle $\theta_1$ that is the inclination angle of the servo stripes 113 of the A burst 111A and the predetermined angle $\theta_2$ that is the inclination angle of the servo stripes 113 of the B burst 111B are different from each other. More specifically, the predetermined angle $\theta_1$ of the servo stripes 113 of the A burst 111A may be larger than the predetermined angle $\theta_2$ of the servo stripes 113 of the B burst 111B, or the predetermined angle $\theta_2$ of the servo stripes 113 of the B burst 111B may be larger than the predetermined angle $\theta_1$ of the servo stripes 113 of the A burst 111A. That is, the inclination of the servo stripes 113 of the A burst 111A may be larger than the inclination of the servo stripes 113 of the B burst 111B, or the inclination of the servo stripes 113 of the B burst 111B may be larger than the inclination of the servo stripes 113 of the A burst 111A. Note that FIG. 6 shows an example in which the predetermined angle $\theta_1$ of the servo stripes 113 of the A burst 111A is larger than the predetermined angle $\theta_2$ of the servo stripes 113 of the B burst 111B. A case where the predetermined angle $\theta_1$ of the servo stripes 113 of the A burst 111A is larger than the predetermined angle $\theta_2$ of the servo stripes 113 of the B burst 111B will be described below.

The servo subframe 2 (112) includes a C burst 112C and a D burst 112D. The D burst 112D is disposed adjacent to the C burst 112C. The C burst 112C includes four servo stripes 113 formed at predetermined intervals and inclined at the predetermined angle $\theta_1$ with respect to the axis Ax parallel to the width direction of the magnetic tape MT. In FIG. 6, these four servo stripes 113 are denoted by reference symbols $C_1$, $C_2$, $C_3$, and $C_4$ from the EOT to the BOT of the magnetic tape MT.

The D burst 112D includes four servo stripes 113 formed at predetermined intervals and inclined at the predetermined angle $\theta_2$ with respect to the axis Ax parallel to the width direction of the magnetic tape MT. In FIG. 6, these four servo stripes 113 are denoted by $D_1$, $D_2$, $D_3$, and $D_4$ from the EOT to the BOT of the magnetic tape MT.

The servo stripes 113 of the D burst 112D are inclined in the opposite direction to the servo stripes 113 of the C burst 112C. The servo stripes 113 of the C burst 112C and the servo stripes 113 of the D burst 112D are asymmetric with respect to the axis Ax parallel to the width direction of the magnetic tape MT. That is, the servo stripes 113 of the C burst 112C and the servo stripes 113 of the D burst 112D are disposed in a substantially inverted V-shape. Since the servo stripes 113 of the C burst 112C and the servo stripes 113 of the D burst 112D are asymmetric with respect to the axis Ax, there is a state in which the servo stripes 113 of the C burst 112C and the servo stripes 113 of the D burst 112D are substantially symmetric with respect to the central axis of the head unit 56 when the head unit 56 is inclined with respect to the axis Ax. By changing the inclination of the head unit 56 with reference to this state, it is possible to adjust the distance between servos.

The predetermined angle $\theta_1$ that is the inclination angle of the servo stripes 113 of the C burst 112C and the predetermined angle $\theta_2$ that is the inclination angle of the servo stripes 113 of the D burst 112D are different from each other. More specifically, the predetermined angle $\theta_1$ of the servo stripes 113 of the C burst 112C may be larger than the predetermined angle $\theta_2$ of the servo stripes 113 of the D burst 112D, or the predetermined angle $\theta_2$ of the servo stripes 113 of the D burst 112D may be larger than the predetermined angle $\theta_1$ of the servo stripes 113 of the C burst 112C. That is, the inclination of the servo stripes 113 of the C burst 112C may be larger than the inclination of the servo stripes 113 of the D burst 112D, or the inclination of the servo stripes 113 of the D burst 112D may be larger than the inclination of the servo stripes 113 of the C burst 112C. Note that FIG. 6 shows an example in which the predetermined angle $\theta_1$ of the servo stripes 113 of the C burst 112C is larger than the predetermined angle $\theta_2$ of the servo stripes 113 of the D burst 112D. A case where the predetermined angle $\theta_1$ of the servo stripes 113 of the C burst 112C is larger than the predetermined angle $\theta_2$ of the servo stripes 113 of the D burst 112D will be described below.

The above predetermined angle $\theta_1$ of the servo stripes 113 in the A burst 111A and the C burst 112C is favorably 180 or more and 280 or less, more favorably 180 or more and 260 or less. The above predetermined angle $\theta_2$ of the servo stripes 113 in the B burst 111B and the D burst 112D is favorably −4° or more and 6° or less, more favorably −2° or more and 6° or less. The servo stripes 113 in the A burst 111A and the C burst 112C are an example of the first magnetized region. The servo stripes 113 in the B burst 111B and the D burst 112D are an example of the second magnetized region.

By reading the servo band SB with the head unit 56, information for obtaining the tape speed and the position of the head unit 56 in the longitudinal direction is acquired. The tape speed Y is calculated from the time between four timing signals (A1-C1, A2-C2, A3-C3, and A4-C4). The head position X is calculated from the above-mentioned time between four timing signals and the time between other four timing signals (A1-B1, A2-B2, A3-B3, and A4-B4). The servo pattern may have a shape including two parallel lines.

As shown in FIG. 6, the servo pattern (i.e., the plurality of servo stripes 113) is favorably arranged linearly in the longitudinal direction of the magnetic tape MT. That is, the servo band SB is favorably linear in the longitudinal direction of the magnetic tape MT.

The upper limit value of an average thickness $t_1$ of the magnetic layer 43 is favorably 80 nm or less, more favorably 65 nm or less, and still more favorably 55 nm or less. When the upper limit value of the average thickness $t_1$ of the magnetic layer 43 is 80 nm or less, the effect of the demagnetizing field can be reduced in the case of using a ring-type head as a recording head, and thus, further excellent electromagnetic conversion characteristics can be achieved.

The lower limit value of the average thickness $t_1$ of the magnetic layer 43 is favorably 35 nm or more. When the lower limit value of the average thickness $t_1$ of the magnetic layer 43 is 35 nm or more, the output can be secured in the case of using an MR-type head as a reproduction head, and thus, further excellent electromagnetic conversion characteristics can be achieved.

The average thickness $t_1$ of the magnetic layer 43 is obtained as follows. First, the magnetic tape MT housed in the cartridge 10 is unwound, and the magnetic tape MT is cut into a length of 250 mm at positions in the longitudinal direction 10 m to 20 m, 30 m to 40 m, and 50 m to 60 m from the connection part 21 between the magnetic tape MT and the leader tape LT to prepare three samples. Subsequently, each sample is processed by an FIB method or the like for slicing. In the case of using an FIB method, a carbon layer and a tungsten layer are formed as protective layers as pre-processing for observing a TEM image of a cross section described below. The carbon layer is formed on the surfaces of the magnetic tape MT on the side of the magnetic layer 43 and on the side of the back layer 44 by a vapor deposition method, and the tungsten layer is further formed on the surface on the side of the magnetic layer 43 by a vapor deposition method or a sputtering method. The slicing is performed along the longitudinal direction of the magnetic tape MT. That is, the slicing forms a cross section parallel to both the longitudinal direction and thickness direction of the magnetic tape MT.

The above cross section of each obtained sliced sample is observed under the following conditions using a transmission electron microscope (TEM) to obtain a TEM image of each sliced sample. Note that the magnification and the acceleration voltage may be adjusted as appropriately in accordance with the type of apparatus.

Apparatus: TEM (H9000NAR manufactured by Hitachi, Ltd.)

Acceleration voltage: 300 kV

Magnification: 100,000 times

Next, the obtained TEM image of each sliced sample is used to measure the thickness of the magnetic layer 43 at 10 positions of each sliced sample. Note that the 10 measurement positions of each sliced sample are randomly selected from the sample such that they are different positions in the longitudinal direction of the magnetic tape MT. An average value obtained by simply averaging (arithmetically averaging) the measured values (30 thicknesses of the magnetic layer 43 in total) of each obtained sliced sample is used as the average thickness $t_1$ [nm] of the magnetic layer 43.

(Magnetic Particles)

The magnetic particles are, for example, particles containing hexagonal ferrite (hereinafter, referred to as "hexagonal ferrite particles"), particles containing epsilon-type iron oxide (ε-iron oxide) (hereinafter, referred to as "ε-iron oxide particles"), or particles containing Co-containing spinel ferrite (hereinafter, referred to as "cobalt ferrite particles"). It is favorable that the magnetic particles are preferentially crystal-oriented in the perpendicular direction of the magnetic tape MT. In the present specification, the perpendicular direction (thickness direction) of the magnetic tape MT means the thickness direction of the magnetic tape MT in a flat state.

(Hexagonal Ferrite Particles)

The hexagonal ferrite particles each have, for example, a plate shape such as a hexagonal plate shape or a columnar shape such as a hexagonal columnar shape (however, the thickness or height is smaller than the long diameter of the plate surface or bottom surface). In the present specification, the hexagonal plate shape includes a substantially hexagonal plate shape. The hexagonal ferrite favorably includes at least one selected from the group consisting of Ba, Sr, Pb, and Ca, more favorably at least one selected from the group consisting of Ba and Sr. Specifically, the hexagonal ferrite may be, for example, barium ferrite or strontium ferrite. The barium ferrite may further include at least one selected from the group consisting of Sr, Pb, and Ca, in addition to Ba. The strontium ferrite may further include at least one selected from the group consisting of Ba, Pb, and Ca, in addition to Sr.

More specifically the hexagonal ferrite has an average composition represented by a general formula $MFe_{12}O_{19}$. However, M represents, for example, at least one metal selected from the group consisting of Ba, Sr, Pb, and Ca, favorably at least one metal selected from the group consisting of Ba and Sr. M may represent a combination of Ba and at least one metal selected from the group consisting of Sr, Pb, and Ca. Further, M may represent a combination of Sr and at least one metal selected from the group consisting of Ba, Pb, and Ca. In the above general formula, some Fes may be substituted with another metal element.

In the case where the magnetic particles include hexagonal ferrite particles, the average particle size of the magnetic particles is favorably 13 nm or more and 20 nm or less, more favorably 13 nm or more and 19 nm or less, still more favorably 13 nm or more and 18 nm or less, particularly favorably 14 nm or more and 17 nm or less, and most favorably 14 nm or more and 16 nm or less. When the average particle size of the magnetic particles is 20 nm or less, it is possible to achieve further excellent electromagnetic conversion characteristics (e.g., SNR) in the magnetic tape MT having high recording density. Meanwhile, when the average particle size of the magnetic particles is 13 nm or more, the dispersibility of the magnetic particles is improved, and it is possible to achieve further excellent electromagnetic conversion characteristics (e.g., SNR).

In the case where the magnetic particles include hexagonal ferrite particles, the average aspect ratio of the magnetic particles is favorably 1.0 or more and 3.0 or less, more favorably 1.5 or more and 2.8 or less, and still more favorably 1.8 or more and 2.7 or less. When the average aspect ratio of the magnetic particles is within the range of 1.0 or more and 3.0 or less, the aggregation of the magnetic particles can be suppressed. Further, when the magnetic particles are perpendicularly oriented in the process of forming the magnetic layer 43, the resistance to be applied to the magnetic particles can be suppressed. Therefore, it is possible to improve the perpendicular orientation of the magnetic particles.

In the case where the magnetic particles include hexagonal ferrite particles, the average particle size and the average aspect ratio of the magnetic particles are obtained as follows. First, the magnetic tape MT housed in the cartridge 10 is unwound, and the magnetic tape MT is cut out at a position 30 m to 40 m in the longitudinal direction from the connection part 21 between the magnetic tape MT and the leader tape LT. Subsequently, the magnetic tape MT to be measured is processed by an FIB method or the like for slicing. In the case of using an FIB method, a carbon layer and a tungsten layer are formed as protective layers as pre-processing for observing a TEM image of a cross section described below. The carbon layer is formed on the surfaces of the magnetic tape MT on the side of the magnetic layer 43 and on the side of the back layer 44 by a vapor deposition method, and the tungsten layer is further formed on the surface on the side of the magnetic layer 43 by a vapor deposition method or a sputtering method. The slicing is performed along the length direction (longitudinal direction) of the magnetic tape MT. That is, the slicing forms a cross section parallel to both the longitudinal direction and thickness direction of the magnetic tape MT.

The above cross section of the obtained sliced sample is observed using H-9500 manufactured by Hitachi High-Technologies Corporation at an acceleration voltage: 200 kV and a total magnification of 500,000 times such that the entire magnetic layer 43 is included in the thickness direction of the magnetic layer 43 to take a TEM image. TEM images are prepared in such a number that 50 particles for which a plate diameter PD and a plate thickness DA (see FIG. 7) shown below can be measured can be extracted.

In the present specification, regarding the size of the hexagonal ferrite particles (hereinafter, referred to as "particle size".), in the case where the shape of each particle observed in the above TEM image is a plate shape or a columnar shape (however, the thickness or height is smaller than the long diameter of the plate surface or bottom surface.) as shown in FIG. 7, the long diameter of the plate surface or bottom surface is used as the value of the plate diameter PD. The thickness or height of the particle observed in the above TEM image is used as the value of the plate thickness DA. In the case where the thickness or height of one particle is not constant in the particle observed in the TEM image, the maximum thickness or height of the particle is used as the plate thickness DA.

Next, 50 particles to be extracted from the taken TEM image are selected on the basis of the following criteria. Particles that are partially outside the field of view of the TEM image are not measured, and particles that have a clear outline and are present in isolation are measured. In the case where particle overlap with each other, if the boundary between the particles is clear and the shape of the entire particle can be determined, each particle is measured as a single particle. However, particles whose boundaries are unclear and whose overall shapes are also unclear are not measured as the shape of the particle cannot be determined.

FIG. 8 and FIG. 9 respectively show a first example and a second example of the TEM image. In FIG. 8 and FIG. 9, for example, particles indicated by arrows a and d are selected because their plate thickness (thickness or height of the particle) DA can be clearly checked. The plate thickness DA of each of the 50 selected particles is measured. The plate thicknesses DA thus obtained are simply averaged (arithmetically averaged) to obtain an average plate thickness $DA_{ave}$. The average plate thickness $DA_{ave}$ is an average particle plate thickness. Subsequently, the plate diameter PD of each magnetic particle is measured. In order to measure the plate diameter PD of the particle, 50 particles whose plate diameter PD can be clearly checked are selected from the taken TEM image. For example, in FIG. 8 and FIG. 9, for example, particles indicated by arrows b and c are selected because the plate diameter PD can be clearly checked. The plate diameter PD of each of the 50 selected particles is measured. The plate diameters PD obtained in this way are simply averaged (arithmetically averaged) to obtain an average plate diameter $PD_{ave}$. The average plate diameter $PD_{ave}$ is the average particle size. Then, the average aspect ratio ($PD_{ave}/DA_{ave}$) of the particles is obtained on the basis of the average plate thickness $DA_{ave}$ and the average plate diameter $PD_{ave}$.

In the case where the magnetic particles include hexagonal ferrite particles, the average particle volume of the magnetic particles is favorably 500 $nm^3$ or more and 1800 $nm^3$ or less, more favorably 500 $nm^3$ or more and 1600 $nm^3$ or less, still more favorably 500 $nm^3$ or more and 1400 $nm^3$ or less, particularly favorably 600 $nm^3$ or more and 1200 $nm^3$ or less, and most favorably 600 $nm^3$ or more and 1000 $nm^3$ or less. When the average particle volume of the magnetic particles is 1800 $nm^3$ or less, effects similar to those in the case where the average particle size of the magnetic particles is 22 nm or less can be achieved. Meanwhile, when the average particle volume of the magnetic particles is 500 $nm^3$ or more, effects similar to those in the case where the average particle size of the magnetic particles is 13 nm or more can be achieved.

The average particle volume of the magnetic particles is obtained as follows. First, the average plate thickness $DA_{ave}$ and the average plate diameter $PD_{ave}$ are obtained as described above regarding the method of calculating the average particle size of the magnetic particles. Next, an average volume V of the magnetic particles is obtained by the following formula.

$$V = \frac{3\sqrt{3}}{8} \times DA_{ave} \times PD_{ave} \times PD_{ave} \quad \text{(Math. 1)}$$

(ε-Iron Oxide Particles)

The ε-iron oxide particles are hard magnetic particles capable of achieving a high coercive force even as fine particles. The ε-iron oxide particles each have a spherical shape or a cubic shape. In the present specification, the spherical shape includes a substantially spherical shape. Further, the cubic shape includes a substantially cubic shape. Since the ε-iron oxide particles each have the above shape, in the case where ε-iron oxide particles are used as magnetic particles, the contact area between particles in the thickness direction of the magnetic tape MT can be reduced and the aggregation of the particles can be suppressed as compared with the case where barium ferrite particles each having a hexagonal plate shape are used as magnetic particles. Therefore, it is possible to improve the dispersibility of the magnetic particles and achieve further excellent electromagnetic conversion characteristics (e.g., SNR).

The ε-iron oxide particles may each have a structure of a composite particle. More specifically, the ε-iron oxide particles each include an ε-iron oxide portion and a portion having soft magnetism or a magnetic portion having a saturation magnetization amount σs higher than that of ε-iron oxide and a coercive force Hc smaller than that of ε-iron oxide (hereinafter, referred to as a "portion having soft magnetism or the like").

The ε-iron oxide portion contains ε-iron oxide. The ε-iron oxide contained in the ε-iron oxide portion favorably has $\varepsilon\text{-}Fe_2O_3$ crystals as the main phase, more favorably single-phase $\varepsilon\text{-}Fe_2O_3$.

The portion having soft magnetism or the like is at least partially in contact with the ε-iron oxide portion. Specifically, the portion having soft magnetism or the like may partially cover the ε-iron oxide portion or may cover the entire periphery of the ε-iron oxide portion.

The portion having soft magnetism (the magnetic portion having a saturation magnetization amount σs higher than that of ε-iron oxide and a coercive force Hc smaller than that of ε-iron oxide) contains a soft magnetic material such as α-Fe, a Ni—Fe alloy, and a Fe—Si—Al alloy. α-Fe may be one obtained by reducing ε-iron oxide contained in the ε-iron oxide portion.

Further, the portion having soft magnetism may contain, for example, $Fe_3O_4$, γ-$Fe_2O$, or spinel ferrite.

When the ε-iron oxide particle includes the portion having soft magnetism or the like as described above, the coercive force Hc of the entire ε-iron oxide particle (composite particle) can be adjusted to a coercive force Hc suitable for recording while maintaining the coercive force Hc of the ε-iron oxide portion alone at a large value in order to ensure thermal stability.

The ε-iron oxide particles may include an additive instead of the above structure of the composite particle or may include an additive while having the above structure of the composite particle. In this case, some Fes of the ε-iron oxide particles are substituted with the additives. Also with the ε-iron oxide particles including the additives, the coercive force Hc of the entire ε-iron oxide particles can be adjusted to a coercive force Hc suitable for recording, and thus, it is possible to improve the easiness of recording. The additive is a metal element other than iron, favorably a trivalent metal element, more favorably at least one selected from the group consisting of Al, Ga, and In, and still more favorably at least one selected from the group consisting of $A_1$ and Ga.

Specifically, the ε-iron oxide including the additive is an ε-$Fe_{2-x}M_xO_3$ crystal (where M represents a metal element other than iron, favorably a trivalent metal element, more favorably more favorably at least one selected from the group consisting of Al, Ga, and In, and still more favorably at least one selected from the group consisting of $A_1$ and Ga. x satisfies the following formula represented by: $0<x<1$, for example).

In the case where the magnetic particles include ε-iron oxide particles, the average particle size of the magnetic particles is favorably 10 nm or more and 20 nm or less, more favorably 10 nm or more and 18 nm or less, still more favorably 10 nm or more and 16 nm or less, particularly favorably 10 nm or more and 15 nm or less, and most favorably 10 nm or more and 14 nm or less. In the magnetic tape MT, the region half the size of the recording wavelength is an actual magnetized region. For this reason, by setting the average particle size of the magnetic particles to half or less of the shortest recording wavelength, it is possible to achieve further excellent electromagnetic conversion characteristics (e.g., SNR). Therefore, when the average particle size of the magnetic particles is 20 nm or less, it is possible to achieve further excellent electromagnetic conversion characteristics (e.g., SNR) in the magnetic tape MT with high recording capacity (e.g., the magnetic tape MT configured to be capable of recording signals at the shortest recording wavelength of 40 nm or less). Meanwhile, when the average particle size of the magnetic particles is 10 nm or more, the dispersibility of the magnetic particles is improved, and it is possible to achieve further excellent electromagnetic conversion characteristics (e.g., SNR).

In the case where the magnetic particles include ε-iron oxide particles, the average aspect ratio of the magnetic particles is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic particles is within the range of 1.0 or more and 3.0 or less, the aggregation of the magnetic particles can be suppressed. Further, when the magnetic particles are perpendicularly oriented in the process of forming the magnetic layer 43, the resistance to be applied to the magnetic particles can be suppressed. Therefore, it is possible to improve the perpendicular orientation of the magnetic particles.

In the case where the magnetic particles include ε-iron oxide particles, the average particle size and the average aspect ratio of the magnetic particles are obtained as follows. First, the magnetic tape MT housed in the cartridge 10 is unwound, and the magnetic tape MT is cut out at a position 30 m to 40 m in the longitudinal direction from the connection part 21 between the magnetic tape MT and the leader tape LT. Subsequently, the magnetic tape MT to be measured is processed by an FIB (Focused Ion Beam) method or the like for slicing. In the case of using an FIB method, a carbon layer and a tungsten layer are formed as protective layers as pre-processing for observing a TEM image of a cross section described below. The carbon layer is formed on the surfaces of the magnetic tape MT on the side of the magnetic layer 43 and on the side of the back layer 44 by a vapor deposition method, and the tungsten layer is further formed on the surface on the side of the magnetic layer 43 by a vapor deposition method or a sputtering method. The slicing is performed along the length direction (longitudinal direction) of the magnetic tape MT. That is, the slicing forms a cross section parallel to both the longitudinal direction and thickness direction of the magnetic tape MT.

The above cross section of the obtained sliced sample is observed using H-9500 manufactured by Hitachi High-Technologies Corporation at an acceleration voltage: 200 kV and a total magnification of 500,000 times such that the entire magnetic layer 43 is included in the thickness direction of the magnetic layer 43 to take a TEM image. Next, 50 particles whose shapes can be clearly checked are selected from the take TEM image and a major axis length DL and a minor axis length DS of each particle are measured. Here, the major axis length DL means the largest one (so-called maximum Feret diameter) of the distances between two parallel lines drawn from all angles so as to be in contact with the contour of each particle. Meanwhile, the minor axis length DS means the largest one of the lengths of the particles in the direction perpendicular to the major axis (DL) of the particles. Subsequently, the measured major axis lengths DL of the 50 particles are simply averaged (arithmetically averaged) to obtain an average major axis length $DL_{ave}$. The average major axis length $DL_{ave}$ obtained in this way is the average particle size of the magnetic particles. Further, the measured minor axis lengths DS of the 50 particles are simply averaged (arithmetically averaged) to obtain an average minor axis length $DS_{ave}$. Then, an average aspect ratio ($DL_{ave}/DS_{ave}$) of the particles is obtained on the basis of the average major axis length $DL_{ave}$ and the average short-axis length $DS_{ave}$.

In the case where the magnetic particles include ε-iron oxide particles, the average particle volume of the magnetic particles is favorably 500 $nm^3$ or more and 4000 $nm^3$ or less, more favorably 500 $nm^3$ or more and 3000 $nm^3$ or less, still more favorably 500 $nm^3$ or more and 2000 $nm^3$ or less, particularly favorably 600 $nm^3$ or more and 1600 $nm^3$ or less, and most favorably 600 $nm^3$ or more and 1300 $nm^3$ or less. In general, since the noise of the magnetic tape MT is inversely proportional to the square root of the number of particles (i.e., proportional to the square root of the particle volume), further excellent electromagnetic conversion characteristics (e.g., SNR) can be achieved by making the particle volume smaller. Therefore, when the average particle volume of the magnetic particles is 4000 $nm^3$ or less, further excellent electromagnetic conversion characteristics (e.g., SNR) can be achieved similarly to the case where the average particle size of the magnetic particles is 20 nm or less. Meanwhile, when the average particle volume of the magnetic particles is 500 $nm^3$ or more, effects similar to those in the case where the average particle size of the magnetic particles is 10 nm or more can be achieved.

In the case where ε-iron oxide particles each have a spherical shape, the average particle volume of the magnetic particles is obtained as follows. First, the average major axis length $DL_{ave}$ is obtained in the same manner as the above method of calculating the average particle size of the magnetic particles. Next, an average volume V of the magnetic particles is obtained by the following formula.

$$V = (\pi/6) \times DL_{ave}^3$$

In the case where the ε-iron oxide particles each have a cubic shape, the average particle volume of the magnetic particles is obtained as follows. First, the magnetic tape MT housed in the cartridge 10 is unwound, and the magnetic tape MT is cut out at a position 30 m to 40 m in the longitudinal direction from the connection part 21 between the magnetic tape MT and the leader tape LT. Subsequently, the cut magnetic tape MT is processed by an FIB (Focused Ion Beam) or the like for slicing. In the case of using an FIB method, a carbon film and a tungsten thin film are formed as protective films as pre-processing for observing a TEM image of a cross section described below. The carbon film is formed on the surfaces of the magnetic tape MT on the side of the magnetic layer 43 and on the side of the back layer 44 by a vapor deposition method, and the tungsten thin film is further formed on the surface on the side of the magnetic layer 43 by a vapor deposition method or a sputtering method. The slicing is performed along the length direction (longitudinal direction) of the magnetic tape MT. That is, the slicing forms a cross section parallel to both the longitudinal direction and thickness direction of the magnetic tape MT.

The cross section of the obtained sliced sample is observed using H-9500 manufactured by Hitachi High-Technologies Corporation at an acceleration voltage: 200 kV and a total magnification of 500,000 times such that the entire magnetic layer 43 is included in the thickness direction of the magnetic layer 43 to take a TEM image. Note that the magnification and the acceleration voltage may be adjusted as appropriately in accordance with the type of apparatus. Next, 50 particles whose shapes are clear are selected from the taken TEM image and a side length DC of each particle is measured. Subsequently, the measured side lengths DC of the 50 particles are simply averaged (arithmetically averaged) to obtain an average side length $DC_{ave}$. Next, an average volume $V_{ave}$(particle volume) of the magnetic particles is obtained by the following formula using the average side length $DC_{ave}$.

$$V_{ave} = DC_{ave}^3$$

(Cobalt Ferrite Particles)

It is favorable that the cobalt ferrite particles each have uniaxial crystal anisotropy. When the cobalt ferrite particle has uniaxial crystal anisotropy, the magnetic particles can be preferentially crystal-oriented in the perpendicular direction of the magnetic tape MT. The cobalt ferrite particle has, for example, a cubic shape. In the present specification, the cubic shape includes a substantially cubic shape. The Co-containing spinel ferrite may further include at least one selected from the group consisting of Ni, Mn, Al, Cu, and Zn, in addition to Co.

The Co-containing spinel ferrite has an average composition represented by the following formula, for example.

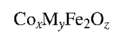

$$Co_xM_yFe_2O_z$$

(in the formula, M represents, for example, at least one metal selected from the group consisting of Ni, Mn, Al, Cu, and Zn. x represents a value within the range of 0.4≤x≤1.0. y represents a value within the range of 0≤y≤0.3. However, x and y satisfy the relationship represented by the following formula: (x+y)≤1.0. z represents a value within the range of 3≤z≤4. Some Fes may be substituted with other metal elements)

In the case where the magnetic particles include cobalt ferrite particles, the average particle size of the magnetic particles is favorably 8 nm or more and 16 nm or less, more favorably 8 nm or more and 13 nm or less, and still more favorably 8 nm or more and 10 nm or less. When the average particle size of the magnetic particles is 16 nm or less, it is possible to achieve further excellent electromagnetic conversion characteristics (e.g., SNR) in the magnetic tape MT having high recording density. Meanwhile, the average particle size of the magnetic particles is 8 nm or more, the dispersibility of the magnetic particles is improved, and it is possible to achieve further excellent electromagnetic conversion characteristics (e.g., SNR). The method of calculating the average particle size of the magnetic particles is similar to the method of calculating the average particle size of the magnetic particles in the case where the magnetic particles include ε-iron oxide particles.

In the case where the magnetic particles include cobalt ferrite particles, the average aspect ratio of the magnetic particles is favorably 1.0 or more and 3.0 or less, more favorably 1.0 or more and 2.5 or less, and still more favorably 1.0 or more and 2.0 or less. When the average aspect ratio of the magnetic particles is within the range of 1.0 or more and 3.0 or less, the aggregation of the magnetic particles can be suppressed. Further, when the magnetic particles are perpendicularly oriented in the process of forming the magnetic layer 43, the resistance to be applied to the magnetic particles can be suppressed. Therefore, it is possible to improve the perpendicular orientation of the magnetic particles. The method of calculating the average aspect ratio of the magnetic particles is similar to the method of calculating the average aspect ratio of the magnetic particles in the case where the magnetic particles include a powder of ε-iron oxide particles.

In the case where the magnetic particles include a powder of cobalt ferrite particles, the average particle volume of the magnetic particles is favorably 500 $nm^3$ or more and 4000 $nm^3$ or less, more favorably 600 $nm^3$ or more and 2000 $nm^3$ or less, and still more favorably 600 $nm^3$ or more and 1000 $nm^3$ or less. When the average particle volume of the magnetic particles is 4000 $nm^3$ or less, effects similar to those in the case where the average particle size of the magnetic particles is 16 nm or less can be achieved. Meanwhile, when the average particle volume of the magnetic particles is 500 $nm^3$ or more, effects similar to those in the case where the average particle size of the magnetic particles is 8 nm or more can be achieved. The method of calculating the average particle volume of the magnetic powder is similar to the method of calculating the average particle volume in the case where the ε-iron oxide particles each have a cubic shape.

(Conductive Particle)

As shown in Part B of FIG. 3, some particles of the conductive particles 431 included in the magnetic layer 43 protrude from the magnetic surface and form a plurality of first protrusions 431A. When the head unit 56 slides over the magnetic tape MT, the plurality of first protrusions 431A is capable of coming into contact with the head unit 56. By forming the plurality of first protrusions 431A by the conductive particles 431, it is possible to reduce the electric resistance of the magnetic surface and suppress charging of the magnetic surface. Further, it is possible to reduce the dynamic friction between the head unit 56 and the magnetic surface during travelling of the magnetic tape MT.

The conductive particle 431 is favorably an antistatic agent and a solid lubricant. The conductive particle 431 is favorably a particle containing carbon. As the particle containing carbon, for example, at least one selected from the group consisting of a carbon particle and a hybrid particle can be used, and a carbon particle is favorably used. The average primary particle size of the conductive particles 431 is favorably 100 nm or less. When the average primary particle size of the conductive particles 431 is 100 nm or less, the inclusion of excessively large particles relative to the thickness of the magnetic layer 43 is suppressed even in the case where the conductive particle 431 is a particle with large granularity distribution (e.g., carbon black).

As the carbon particle, for example, at least one selected from the group consisting of carbon black, acetylene black, ketjen black, carbon nanotube, and graphene can be used, and carbon black of these carbon particles is favorably used. As the carbon black, for example, SEAST TA manufactured by Tokai Carbon Co., Ltd. or Asahi #15, #15HS, or the like manufactured by ASAHI CARBON CO., LTD. can be used.

The hybrid particle contains carbon and a material other than carbon. The material other than carbon is, for example, an organic material or an inorganic material. The hybrid particle may be a hybrid particle in which carbon is attached to the surface of an inorganic particle. Specifically, for example, the hybrid particle may be hybrid carbon in which carbon is attached to the surface of a silica particle.

(Abrasive Particle)

As shown in Part B of FIG. 3, some particles of the abrasive particles 432 included in the magnetic layer 43 protrude from the magnetic surface to form the protrusion 430. When the head unit 56 slides over the magnetic tape MT, the protrusion 430 formed by the abrasive particle 432 is capable of coming into contact with the head unit 56.

The lower limit value of the Mohs hardness of the abrasive particle 432 is 7.0 or more, favorably 7.5 or more, more favorably 8.0 or more, and still more favorably 8.5 or more from the viewpoint of suppressing deformation due to contact with the head unit 56. The upper limit value of the Mohs hardness of the abrasive particle 432 is favorably 9.5 or less from the viewpoint of suppressing wear of the head unit 56.

The abrasive particle 432 is favorably an inorganic particle. Examples of the inorganic particle include α-alumina having an a transformation rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by dehydrating and annealing a raw material of magnetic iron oxide, those obtained by performing surface treatment thereon with aluminum and/or silica as necessary, and a diamond powder. As the inorganic particle, alumina particles such as α-alumina, β-alumina, and γ-alumina, and silicon carbide are favorably used. The abrasive particle 432 may have any shape such as a needle shape, a spherical shape, and a dice shape, but those with some corners in their shapes are favorable because they have high abrasiveness.

(Binder)

The binder includes, for example, a thermoplastic resin. The binder may further include a thermosetting resin, a reactive resin, or the like.

The thermoplastic resin includes a first thermoplastic resin containing a chlorine atom (first binder) and a second thermoplastic resin containing a nitrogen atom (second binder). More specifically, the thermoplastic resin includes a vinyl chloride resin and a urethane resin. In the present specification, the vinyl chloride resin means a polymer including a structural unit derived from vinyl chloride. More specifically, for example, the vinyl chloride resin means a homopolymer of vinyl chloride, a polymer of vinyl chloride and a comonomer that is copolymerizable therewith, and a mixture of these polymers.

The vinyl chloride resin includes, for example, at least one selected from the group consisting of vinyl chloride, a vinyl chloride-vinyl acetate copolymer, a vinyl chloride-vinylidene chloride copolymer, a vinyl chloride-acrylonitrile copolymer, an acrylic acid ester-vinyl chloride-vinylidene chloride copolymer, and a methacrylic acid ester-vinyl chloride copolymer.

The urethane resin means a resin including a urethane bond in at least part of the molecular chain constituting the resin, and may be a urethane resin or a copolymer including a urethane bond in part of the molecule chain. The urethane resin may be, for example, one obtained by reacting a polyisocyanate with a polyol. Alternatively, the urethane resin may be, for example, one obtained by reacting a polyester with a polyol. In the present specification, the urethane resin also includes one obtained by a reaction with a curing agent.

The polyisocyanate includes, for example, at least one selected from the group consisting of diphenylmethane diisocyanate (MDI), tolylene diisocyanate (TDI), xylylene diisocyanate (XDI), 1,5-pentamethylene diisocyanate (PDI), hexamethylene diisocyanate (HDI), and isophorone diisocyanate (IPDI). In the present specification, the polyisocyanate means a compound having two or more isocyanate groups in the molecule. The polyisocyanate may be a polyisocyanate contained in a curing agent.

An arbitrary appropriate polyol can be adopted as the polyol as long as it is a polyol having two or more OH groups. The polyol includes, for example, at least one selected from the group consisting of a polyol having two OH groups (diol), a polyol having three OH groups (triol), a polyol having four OH groups (tetraol), a polyol having five OH groups (pentaol), and a polyol having six OH groups (hexaol). Specifically, the polyol includes, for example, at least one selected from the group consisting of a polyester polyol, a polyether polyol, a polycarbonate polyol, a polyesteramide polyol, and an acrylate polyol.

The polyester includes at least one selected from the group consisting of a phthalic acid polyester and an aliphatic polyester.

The thermoplastic resin may further include a thermoplastic resin other than the vinyl chloride resin and the urethane resin. Such a thermoplastic resin includes, for example, at least one selected from the group consisting of vinyl acetate, an acrylic acid ester-acrylonitrile copolymer, an acrylic acid ester-acrylonitrile copolymer, an acrylic acid ester-vinylidene chloride copolymer, a methacrylic acid ester-vinylidene chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyester resin, an amino resin, and synthetic rubber.

The thermosetting resin includes, for example, at least one selected from the group consisting of a phenolic resin, an epoxy resin, a polyurethane curable resin, a urea resin, a melamine resin, an alkyd resin, a silicone resin, a polyamine resin, and a urea formaldehyde resin.

In order to improve the dispersibility of the magnetic particles, a polar functional group such as —$SO_3M$, —$OSO_3M$, —COOM, P═$O(OM)_2$ (where M represents a hydrogen atom or an alkali metal such as lithium, potassium, and sodium), a side chain amine having a terminal group represented by —NR1R2 or —$NR1R2R3^+X^-$, a main chain amine represented by >$NR1R2^+X^-$ (where R1, R2, and R3 each represent a hydrogen atom or a hydrocarbon group, and $X^-$ represents a halogen element ion such as fluorine, chlorine, bromine, and iodine, an inorganic ion, or an organic ion), —OH, —SH, —CN, or an epoxy group may be introduced into all the above binders. The amount of polar functional groups introduced into the binder is favorably $10^{-1}$ or more and $10^{-8}$ or less mol/g, more favorably $10^{-2}$ or more and $10^{-6}$ or less mol/g.

(Lubricant)

The lubricant contains, for example, at least one of a fatty acid or a fatty acid ester, favorably both a fatty acid and a fatty acid ester. The magnetic layer 43 containing a lubricant, particularly the magnetic layer 43 containing both a fatty acid and a fatty acid ester, contributes to improving the travelling stability of the magnetic tape MT. More particularly, when the magnetic layer 43 contains a lubricant and has a pore, favorable travelling stability can be achieved. The reason why the travelling stability is improved is presumably because the dynamic friction coefficient of the surface of the magnetic tape MT on the side of the magnetic layer 43 is adjusted to a value suitable for travelling of the magnetic tape MT by the above lubricant.

The fatty acid may favorably be a compound represented by the following general formula (1) or (2). For example, one of the compound represented by the following general formula (1) and the compound represented by the general formula (2) may be contained as a fatty acid, or both of them may be contained.

Further, the fatty acid ester may favorably be a compound represented by the following general formula (3) or (4). For example, one of the compound represented by the following general formula (3) and the compound represented by the general formula (4) may be contained as the fatty acid ester, or both of them may be contained.

When the lubricant contains one or both of the compound represented by the general formula (1) and the compound represented by the general formula (2) and the compound represented by the general formula (3) and the compound represented by the general formula (4), it is possible to suppress an increase in the dynamic friction coefficient due to repeated recording or reproduction of the magnetic tape MT.

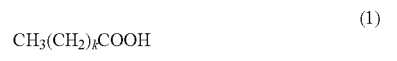

$$CH_3(CH_2)_kCOOH \quad (1)$$

(However, in the general formula (1), k represents an integer selected from the range of 14 or more and 22 or less, more favorably the range of 14 or more and 18 or less.)

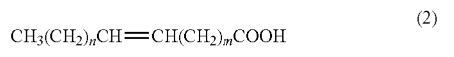

$$CH_3(CH_2)_nCH{=}CH(CH_2)_mCOOH \quad (2)$$

(However, in the general formula (2), the sum of n and m is an integer selected from the range of 12 or more and 20 or less, more favorably the range of 14 or more and 18 or less.)

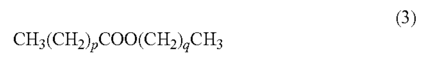

$$CH_3(CH_2)_pCOO(CH_2)_qCH_3 \quad (3)$$

(However, in the general formula (3), p represents an integer selected from the range of 14 or more and 22 or less, more favorably the range of 14 or more and 18 or less, and q represents an integer selected from the range of 2 or more and 5 or less, more favorably the range of 2 or more and 4 or less.)

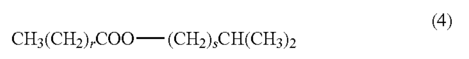

$$CH_3(CH_2)_rCOO{-}(CH_2)_sCH(CH_3)_2 \quad (4)$$

(However, in the general formula (4), r represents an integer selected from the range of 14 or more and 22 or less, and s represents an integer selected from the range of 1 or more and 3 or less.)

(Antistatic Agent)

The antistatic agent includes a carbon particle. The antistatic agent may further include at least one selected from the group consisting of a natural surfactant, a nonionic surfactant, and a cationic surfactant. The carbon particle includes, for example, at least one selected from the group consisting of carbon black, acetyleneblack, ketjen black, carbon nanotube, and graphene.

(Curing Agent)

The curing agent includes, for example, a polyisocyanate. The polyisocyanate may be, for example, one containing, as an isocyanate source, diphenylmethane diisocyanate (MDI), tolylene diisocyanate (TDI), xylylene diisocyanate (XDI), 1,5-pentamethylene diisocyanate (PDI), hexamethylene diisocyanate (HDI), or isophorone diisocyanate (IPDI). The polyisocyanate may have a TMP adduct structure, an isocyanurate structure, a biuret structure, an allophanate structure, or the like.

Specifically, the polyisocyanate includes, for example, aromatic polyisocyanate such as an adduct of tolylene diisocyanate (TDI) and an active hydrogen compound, or aliphatic polyisocyanate such as an adduct of hexamethylene diisocyanate (HMDI) and an active hydrogen compound. The weight average molecular weight of these polyisocyanates is desirably within the range of 100 or more and 3000 or less.

(Rust Inhibitor)

Examples of the rust inhibitor include phenols, naphthols, quinones, a heterocyclic compound containing a nitrogen atom, a heterocyclic compound containing an oxygen atom, and a heterocyclic compound containing a sulfur atom.

(Non-Magnetic Reinforcing Particle)

Examples of the non-magnetic reinforcing particles include aluminum oxide (α, β, or γ alumina), chromium oxide, silicon oxide, diamond, garnet, emery, boron nitride, titanium carbide, silicon carbide, titanium carbide, and titanium oxide (rutile or anatase type titanium oxide).

(Underlayer)

The underlayer 42 is for reducing the unevenness of the surface of the base 41 and adjusting the unevenness of the magnetic surface. The underlayer 42 is a non-magnetic layer including non-magnetic particles, a binder, and a lubricant. The underlayer 42 supplies the lubricant to the magnetic surface. The underlayer 42 may further include at least one additive selected from the group consisting of an antistatic agent, a curing agent, and a rust inhibitor, as necessary.

An average thickness $t_2$ of the underlayer 42 is favorably 300 nm or more and 1200 nm or less, more favorably 300 nm or more and 900 nm or less, 300 nm or more and 600 nm or less. Note that the average thickness $t_2$ of the underlayer 42 is obtained in the same manner as the average thickness $t_1$ of the magnetic layer 43. However, the magnification of the TEM image is adjusted as appropriate in accordance with the thickness of the underlayer 42. When the average thickness $t_2$ of the underlayer 42 is 1200 nm or less, the stretchability of the magnetic tape MT due to an external force further increases, and thus, the width of the magnetic tape MT can be adjusted more easily by tension adjustment.

The underlayer 42 favorably includes a plurality of hole portions. By storing the lubricant in the plurality of hole portions, it is possible to further suppress a decrease in the amount of lubricant supplied between the magnetic surface and the head unit 56 even after repeated recording or reproduction (i.e., after the head unit 56 is caused to come into contact with the surface of the magnetic tape MT and repeatedly travel). Therefore, it is possible to further suppress an increase in the dynamic friction coefficient. That is, further excellent travelling stability can be achieved.

(Non-Magnetic Particles)

The non-magnetic particles include, for example, at least one of inorganic particles or organic particles. Further, the non-magnetic particles may be carbon particles such as carbon black. Note that one type of non-magnetic particle may be used alone, or two or more types of non-magnetic particles may be used in combination. The inorganic particles contain, for example, a metal, a metal oxide, a metal carbonate, a metal sulfate, a metal nitride, a metal carbide, a metal sulfide, or the like. Examples of the shape of the non-magnetic particles include various shapes such as a needle shape, a spherical shape, a cubic shape, and a plate shape, but the shape is not limited thereto.

(Binder and Lubricant)

The binder and the lubricant are similar to those in the above magnetic layer 43.

(Additive)

The antistatic agent, the curing agent, and the rust inhibitor are similar to those in the above magnetic layer 43.

(Back Layer)

The back layer 44 includes a binder and non-magnetic particles. The back layer 44 may further include at least one additive selected from the group consisting of a lubricant, a curing agent, and an antistatic agent, as necessary. The binder and the non-magnetic particles are similar to those in the above underlayer 42. The curing agent and the antistatic agent are similar to those in the above magnetic layer 43.

The average particle size of the non-magnetic particles is favorably 10 nm or more and 150 nm or less, more favorably 15 nm or more and 110 nm or less. The average particle size of the non-magnetic particles is obtained in the same manner as the above average particle size of the magnetic particles. The non-magnetic particles may include non-magnetic particles having two or more granularity distributions.

The upper limit value of the average thickness of the back layer 44 is favorably 0.6 μm or less. When the upper limit value of the average thickness of the back layer 44 is 0.6 μm or less, the underlayer 42 and the base 41 can be kept thick even in the case where the average thickness of the magnetic tape MT is 5.3 μm or less, and thus, the travelling stability of the magnetic tape MT in the recording/reproduction apparatus can be maintained. The lower limit value of the average thickness of the back layer 44 is not particularly limited, but is, for example, 0.2 μm or more.

An average thickness $t_b$ of the back layer 44 is obtained as follows. First, an average thickness $t_T$ of the magnetic tape MT is measured. The measurement method of the average thickness $t_T$ is as described in the following "Average thickness of magnetic tape". Subsequently, the magnetic tape MT housed in the cartridge 10 is unwound, and the magnetic tape MT is cut into a length of 250 mm at a position 30 m to 40 m in the longitudinal direction from the connection part 21 between the magnetic tape MT and the leader tape LT to prepare a sample. Next, the back layer 44 of the sample is removed with a solvent such as MEK (methyl ethyl ketone) and dilute hydrochloric acid. Next, the thickness of the sample is measured at five positions using a Laser Hologage (LGH-110C) manufactured by Mitutoyo Corporation, and the measured values are simply averaged (arithmetically averaged) to calculate an average value $t_B$ [μm]. After that, the average thickness $t_b$ [μm] of the back layer 44 is obtained in accordance with the following formula. Note that the above five measurement positions are randomly selected from the sample such that they are different positions in the longitudinal direction of the magnetic tape MT.

$$t_b[\mu m] = t_T[\mu m] - t_B[\mu m]$$

(Average Thickness of Magnetic Tape)

The upper limit value of the average thickness (average total thickness) $t_T$ of the magnetic tape MT is favorably 5.3 μm or less, more favorably 5.1 μm or less, still more favorably 4.9 μm or less, and particularly favorably 4.7 μm or less. When the average thickness $t_T$ of the magnetic tape MT is 5.3 μm or less, it is possible to increase the recording capacity of one data cartridge to be more than that of a general magnetic tape. The lower limit value of the average thickness $t_T$ of the magnetic tape MT is not particularly limited, but is, for example, 3.5 μm or more.

The average thickness $t_T$ of the magnetic tape MT is obtained as follows. First, the magnetic tape MT housed in the cartridge 10 is unwound, and the magnetic tape MT is cut into a length of 250 mm at a position 30 m to 40 m in the longitudinal direction from the connection part 21 between the magnetic tape MT and the leader tape LT to prepare a sample. Next, the thickness of the sample is measured at five positions using a Laser Hologage (LGH-110C) manufactured by Mitutoyo Corporation, and the measured values are simply averaged (arithmetically averaged) to calculate an average thickness $t_T$ [μm]. Note that the above five measurement positions are randomly selected from the sample such that they are different positions in the longitudinal direction of the magnetic tape MT.

(Coercive Force Hc2)

The upper limit value of the coercive force Hc2 of the magnetic layer 43 in the longitudinal direction of the magnetic tape MT is favorably 2000 Oe or less, more favorably 1900 Oe or less, and still more favorably 1800 Oe or less. When the coercive force Hc2 of the magnetic layer 43 in the longitudinal direction of the magnetic tape MT is 2000 Oe or less, sufficient electromagnetic conversion characteristics can be provided even with high recording density.

The lower limit value of the coercive force Hc2 of the magnetic layer 43 measured in the longitudinal direction of the magnetic tape MT is favorably 1000 Oe or more. When the coercive force Hc2 of the magnetic layer 43 measured in the longitudinal direction of the magnetic tape MT is 1000 Oe or more, it is possible to suppress demagnetization due to leakage flux from the recording head.

The above coercive force Hc2 is obtained as follows. First, the magnetic tape MT housed in the cartridge 10 is unwound, the magnetic tape MT is cut out at a position 30 m to 40 m in the longitudinal direction from the connection part 21 between the magnetic tape MT and the leader tape LT, and three magnetic tapes MT are stacked with double sided tape such that orientations of the magnetic tapes MT in the longitudinal direction are the same and then punched out with a φ6.39 mm punch to prepare a measurement sample. At this time, marking is performed with arbitrary non-magnetic ink such that the longitudinal direction (travelling direction) of the magnetic tape MT can be recognized. Then, the M-H loop of the measurement sample (entire magnetic tape MT) corresponding to the longitudinal direction (travelling direction) of the magnetic tape MT is measured using a vibrating sample magnetometer (VSM). Next, the coating films (the underlayer 42, the magnetic layer 43, the back layer 44, and the like) of the magnetic tape MT cut as described above are wiped off with acetone, ethanol, or the like, leaving only the base 41. Then, three obtained bases 41 are stacked with double sided tape and then punched out with a φ6.39 mm punch to prepare a sample for background correction (hereinafter, referred to simply as a “correction sample”). After that, the M-H loop of the correction sample (base 41) corresponding to the longitudinal direction of the base 41 (the longitudinal direction of the magnetic tape MT) is measured using a VSM.

A highly sensitive vibrating sample magnetometer “VSM-P7-15” manufactured by TOEI INDUSTRY CO., LTD. is used to measure the M-H loop of the measurement sample (the entire magnetic tape MT) and the M-H loop of the correction sample (base 41). The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After obtaining the M-H loop of the measurement sample (the entire magnetic tape MT) and the M-H loop of the correction sample (base 41), the M-H loop of the correction sample (base 41) is subtracted from the M-H loop of the measurement sample (the entire magnetic tape MT) to perform background correction, thereby obtaining the M-H loop after background correction. The measurement/analysis program attached to the “VSM-P7-15” is used for this calculation of background correction. The coercive force Hc2 is obtained on the basis of the obtained M-H loop after background correction. Note that for this calculation, the measurement/analysis program attached to the “VSM-P7-15” is used. Note that the above measurement of M-H loops is performed at 25° C.±2° C. and 50% RH±5% RH. Further, “demagnetizing field correction” when measuring the M-H loop in the longitudinal direction of the magnetic tape MT is not performed.

(Squareness Ratio)

A squareness ratio S1 of the magnetic layer 43 in the perpendicular direction of the magnetic tape MT is favorably 62% or more, more favorably 65% or more, still more favorably 68% or more, particularly favorably 72% or more, and most favorably 75% or more. When the squareness ratio S1 is 62% or more, the perpendicular orientation of the magnetic particles is sufficiently high, and thus, further excellent electromagnetic conversion characteristics can be achieved.

The squareness ratio S1 in the perpendicular direction of the magnetic tape MT is obtained as follows. First, the magnetic tape MT housed in the cartridge 10 is unwound, the magnetic tape MT is cut out at a position 30 m to 40 m in the longitudinal direction from the connection part 21 between the magnetic tape MT and the leader tape LT, and three magnetic tapes MT are stacked with double sided tape such that orientations of the magnetic tapes MT in the longitudinal direction are the same and then punched out with a φ6.39 mm punch to prepare a measurement sample. At this time, marking is performed with arbitrary non-magnetic ink such that the longitudinal direction (travelling direction) of the magnetic tape MT can be recognized. Then, the M-H loop of the measurement sample (entire magnetic tape MT) corresponding to the perpendicular direction of the magnetic tape MT (the perpendicular direction of the magnetic tape MT) is measured using a vibrating sample magnetometer (VSM). Next, the coating films (the underlayer 42, the magnetic layer 43, the back layer 44, and the like) of the magnetic tape MT cut as described above are wiped off with acetone, ethanol, or the like, leaving only the base 41. Then, three obtained bases 41 are stacked with double sided tape and then punched out with a φ6.39 mm punch to prepare a sample for background correction (hereinafter, referred to simply as a “correction sample”). After that, the M-H loop of the correction sample (base 41) corresponding to the perpendicular direction of the base 41 (the perpendicular direction of the magnetic tape MT) is measured using a VSM.

A highly sensitive vibrating sample magnetometer “VSM-P7-15” manufactured by TOEI INDUSTRY CO., LTD. is used to measure the M-H loop of the measurement sample (the entire magnetic tape MT) and the M-H loop of the correction sample (base 41). The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After obtaining the M-H loop of the measurement sample (the entire magnetic tape MT) and the M-H loop of the correction sample (base 41), the M-H loop of the correction sample (base 41) is subtracted from the M-H loop of the measurement sample (the entire magnetic tape MT) to perform background correction, thereby obtaining the M-H loop after background correction. The measurement/analysis program attached to the "VSM-P7-15" is used for this calculation of background correction.

A saturation magnetization Ms (emu) and a residual magnetization Mr (emu) of the obtained M-H loop after background correction are substituted into the following formula to calculate the squareness ratio S1(%). Note that the above measurement of M-H loops is performed at 25° C.±2° C. and 50% RH±5% RH. Further, "demagnetizing field correction" when measuring the M-H loop in the perpendicular direction of the magnetic tape MT is not performed. Note that for this calculation, the measurement/analysis program attached to the "VSM-P7-15" is used.

$$\text{Squareness ratio } S1(\%) = (Mr/Ms) \times 100$$

A squareness ratio S2 of the magnetic layer 43 in the longitudinal direction (travelling direction) of the magnetic tape MT is favorably 35% or less, more favorably 30% or less, still more favorably 25% or less, particularly favorably 20% or less, and most favorably 15% or less. When the squareness ratio S2 is 35% or less, the perpendicular orientation of the magnetic particles is sufficiently high, and thus, further excellent electromagnetic conversion characteristics can be achieved. Note that one of the squareness ratio S1 of the magnetic layer 43 in the perpendicular direction of the magnetic tape MT and the squareness ratio S2 of the magnetic layer 43 in the longitudinal direction (travelling direction) of the magnetic tape MT may be within the above favorable range, and the other may be outside the above favorable range. Alternatively, both the squareness ratio S1 of the magnetic layer 43 in the perpendicular direction of the magnetic tape MT and the squareness ratio S2 of the magnetic layer 43 in the longitudinal direction (travelling direction) of the magnetic tape MT may be within the above favorable range.

The squareness ratio S2 in the longitudinal direction of the magnetic tape MT is obtained in the same manner as the squareness ratio S1 except that the M-H loop is measured in the longitudinal direction (travelling direction) of the magnetic tape MT and the base 41.

(Ratio Hc2/Hc1)

A ratio Hc2/Hc1 of a coercive force Hc1 of the magnetic layer 43 in the perpendicular direction of the magnetic tape MT and the coercive force Hc2 of the magnetic layer 43 in the longitudinal direction of the magnetic tape MT satisfies the relationship of favorably Hc2/Hc1≤0.8, more favorably Hc2/Hc1≤0.75, still more favorably Hc2/Hc1≤0.7, particularly favorably Hc2/Hc1≤0.65, and most favorably Hc2/Hc1≤0.6. When the coercive forces Hc1 and Hc2 satisfy the relationship of Hc2/Hc1≤0.8, it is possible to increase the degree of perpendicular orientation of the magnetic particles. Therefore, since the magnetization transition width can be reduced and a high-output signal can be obtained during signal reproduction, further excellent electromagnetic conversion characteristics can be achieved. Note that since the magnetization reacts sensitively to the magnetic field in the perpendicular direction from the recording head when Hc2 is small, as described above, a favorable recording pattern can be formed.

In the case where the ratio Hc2/Hc1 satisfies the relationship of Hc2/Hc1≤0.8, it is particularly effective that the average thickness $t_1$ of the magnetic layer 43 is 90 nm or less. When the average thickness $t_1$ of the magnetic layer 43 exceeds 90 nm, in the case of using a ring-type head as a recording head, there is a possibility that a lower region of the magnetic layer 43 (region on the side of the underlayer 42) is magnetized in the longitudinal direction of the magnetic tape MT and the magnetic layer 43 cannot be uniformly magnetized in the thickness direction. Therefore, even in the case where the ratio Hc2/Hc1 satisfies the relationship of Hc2/Hc1≤0.8 (i.e., the degree of perpendicular orientation of the magnetic particles is increased), there is a possibility that further excellent electromagnetic conversion characteristics cannot be achieved.

The lower limit value of Hc2/Hc1 is not particularly limited, but satisfies the following relationship: 0.5≤Hc2/Hc1, for example. Note that Hc2/Hc1 represents the degree of perpendicular orientation of the magnetic particles, and the smaller Hc2/Hc1, the higher the degree of perpendicular orientation of the magnetic particles.

The method of calculating the coercive force Hc2 of the magnetic layer 43 in the longitudinal direction of the magnetic tape MT is as described above. The coercive force Hc1 of the magnetic layer 43 in the perpendicular direction of the magnetic tape MT is obtained in the same manner as the coercive force Hc2 of the magnetic layer 43 in the longitudinal direction of the magnetic tape MT except that the M-H loop is measured in the perpendicular direction (thickness direction) of the magnetic tape MT and the base 41.

(Activation Volume $V_{act}$)

The activation volume $V_{act}$ is favorably 8000 $nm^3$ or less, more favorably 6000 $nm^3$ or less, still more favorably 5000 $nm^3$ or less, particularly favorably 4000 $nm^3$ or less, and most favorably 3000 $nm^3$ or less. When the activation volume $V_{act}$ is 8000 $nm^3$ or less, the dispersion state of the magnetic particles is favorable, which allows the bit-inversion region to be steep and makes it possible to prevent the magnetization signal recorded on the adjacent track from deteriorating due to the leakage magnetic field from the recording head. Therefore, there is a possibility that further excellent electromagnetic conversion characteristics cannot be achieved.

The above activation volume $V_{act}$ is obtained by the following formula derived by Street&Woolley.

$$V_{act}(\text{nm}^3) = k_B \times T \times X_{irr}/(\mu_0 \times Ms \times S)$$

(where kB: Boltzmann constant ($1.38\times10^{-23}$ J/K), T: temperature (K), $X_{irr}$: irreversible magnetic susceptibility, μ0: vacuum permeability, S: magnetic viscosity coefficient, Ms: saturation magnetization (emu/$cm^3$))

The irreversible magnetic susceptibility $X_{irr}$, the saturation magnetization Ms, and the magnetic viscosity coefficient S substituted into the above formula are obtained as follows using a VSM. Note that the measurement direction using a VSM is the perpendicular direction (thickness direction) of the magnetic tape MT. Further, measurement using a VSM is performed on the measurement sample cut from the long magnetic tape MT at 25° C.±2° C. and 50% RH±5% RH. Further, "demagnetizing field correction" when measuring the M-H loop in the perpendicular direction (thickness direction) of the magnetic tape MT is not performed.

(Irreversible Magnetic Susceptibility $X_{irr}$)

The irreversible magnetic susceptibility $X_{irr}$ is defined as the slope of the residual magnetization curve (DCD curve) near a residual coercive force Hr. First, a magnetic field of −1193 kA/m (15 kOe) is applied to the entire magnetic tape MT, and the magnetic field is returned to zero to create a residual magnetization state. After that, a magnetic field of approximately 15.9 kA/m (200 Oe) is applied in the opposite direction, and the magnetic field is returned to zero again to measure the residual magnetization amount. After that, measurement in which a magnetic field 15.9 kA/m larger than the previously applied magnetic field is applied and the magnetic field is returned to zero is repeatedly performed similarly, and the residual magnetization amount is plotted against the applied magnetic field to measure the DCD curve. The point where the magnetization amount is zero in the obtained DCD curve is used as the residual coercive force Hr, and the DCD curve is differentiated to obtain the slope of the DCD curve in each magnetic field. Of the slopes of the DCD curve, the slope near the residual coercive force Hr is Xirr.

(Saturation Magnetization Ms)

First, the M-H loop after background correction is obtained in the same manner as the above measurement method of the squareness ratio S1. Next, Ms (emu/$cm^3$) is calculated from the value of the saturation magnetization Ms(emu) of the obtained M-H loop and the volume ($cm^3$) of the magnetic layer 43 in the measurement sample. Note that the volume of the magnetic layer 43 is obtained by multiplying the area of the measurement sample by the average thickness $t_1$ of the magnetic layer 43. The method of calculating the average thickness $t_1$ of the magnetic layer 43 necessary for calculating the volume of the magnetic layer 43 is as described above.

(Magnetic Viscosity Coefficient S)

First, a magnetic field of −1193 kA/m (15 kOe) is applied to the entire magnetic tape MT (measurement sample), and the magnetic field is returned to zero to create a residual magnetization state. After that, a magnetic field equivalent to the value of the residual coercive force Hr obtained from the DCD curve is applied in the opposite direction. The magnetization amount is continuously measured at predetermined intervals for 1000 seconds while applying the magnetic field. The relationship between the time t and the magnetization amount M (t) obtained in this way is referred to in the following formula to calculate the magnetic viscosity coefficient S.

$$M(t) = M0 + S \times \ln(t)$$

(where M (t): magnetization amount at the time t, MO: initial magnetization amount, S: magnetic viscosity coefficient, ln (t): natural logarithm of time)

(Surface Roughness $R_b$ of Back Surface)

A surface roughness of the back surface (surface roughness of the back layer 44) $R_b$ favorably satisfies the relationship of Rb≤6.0 [nm]. When the surface roughness $R_b$ of the back surface is within the above range, further excellent electromagnetic conversion characteristics can be achieved.

the surface roughness $R_b$ of the back surface is obtained as follows. First, the magnetic tape MT housed in the cartridge 10 is unwound, and the magnetic tape MT is cut into a length of 100 mm at a position 30 m to 40 m in the longitudinal direction from the connection part 21 between the magnetic tape MT and the leader tape LT to prepare a sample. Next, the sample is placed on a slide glass such that the surface thereof to be measured (surface on the side of the magnetic layer) faces upward, and the end portion of the sample is fixed with mending tape. The surface shape is measured using VertScan (objective lens 20×) as a measuring apparatus, and the surface roughness $R_b$ of the back surface is obtained from the following formula on the basis of the ISO 25178 standard.

The measurement conditions are as follows.

Apparatus: non-contact profilometer using optical interference (non-contact surface/layer cross-sectional shape measurement system VertScan R5500GL-M100-AC manufactured by Ryoka Systems Inc.)

Objective lens: 20×

Measurement region: 640×480 pixels (field of view: approximately 237 μm×178 μm field of view)

Measurement mode: phase

Wavelength filter: 520 nm

CCD: ⅓ inch

Noise removal filter: smoothing 3×3

Surface correction: correction using a quadratic polynomial approximation surface Measurement software: VS-Measure Version5.5.2

Analysis software: VS-viewer Version5.5.5

$$S_a = \frac{1}{A}\int\int_A |Z(x, y)|dxdy \quad \text{(Math. 2)}$$

After measuring the surface roughness at five positions in the longitudinal direction of the magnetic tape MT as described above, the average value of arithmetic average roughnesses Sa (nm) automatically calculated from the surface profiles obtained at the respective positions is used as the surface roughness $R_b$ of the back surface (nm).

(Young's Modulus in Longitudinal Direction of Magnetic Tape)

The upper limit value of the Young's modulus in the longitudinal direction of the magnetic tape MT is favorably 9.0 GPa or less, more favorably 8.0 GPa or less, still more favorably 7.5 GPa or less, and particularly favorably 7.1 GPa or less. When the Young's modulus in the longitudinal direction of the magnetic tape MT is 9.0 GPa or less, the stretchability of the magnetic tape MT due to an external force further increases, and thus, the width of the magnetic tape MT can be adjusted more easily by tension adjustment. Therefore, it is possible to more appropriately suppress off-track and more accurately reproduce the data recorded on the magnetic tape MT. The lower limit value of the Young's modulus in the longitudinal direction of the magnetic tape MT is favorably 3.0 GPa or more, more favorably 4.0 GPa or more. When the lower limit value of the Young's modulus in the longitudinal direction of the magnetic tape MT is 3.0 GPa or more, it is possible to suppress a decrease in travelling stability.

The Young's modulus in the longitudinal direction of the magnetic tape MT is a value indicating the difficulty of expansion and contraction in the longitudinal direction of the magnetic tape MT due to an external force. The larger this value, the more difficult it is for the magnetic tape MT to expand and contract in the longitudinal direction, and the smaller this value, the more easily the magnetic tape MT expands and contracts in the longitudinal direction due to an external force.

Note that although the Young's modulus in the longitudinal direction of the magnetic tape MT is a value relating to the longitudinal direction of the magnetic tape MT, it also correlates with the difficulty of expansion and contraction in the width direction of the magnetic tape MT. That is, the larger this value, the more difficult it is for the magnetic tape MT to expand and contract in the width direction due to an external force, and the smaller this value, the more easily the magnetic tape MT expands and contracts in the width direction due to an external force. Therefore, from the viewpoint of tension adjustment, it is advantageous for the Young's modulus in the longitudinal direction of the magnetic tape MT to be small as described above, i.e., 9.0 GPa or less.

A tensile tester (AG-100D manufactured by Shimadzu Corporation) is used to measure the Young's modulus. In the case where it is desired to measure the Young's modulus in the tape longitudinal direction, the magnetic tape MT housed in the cartridge 10 is unwound, and the magnetic tape MT is cut into a length of 180 mm at a position 30 m to 40 m in the longitudinal direction from the connection part 21 between the magnetic tape MT and the leader tape LT to prepare a measurement sample. A jig capable of fixing the width of the tape (½ inch) is attached to the above tensile tester to fix the top and bottom of the tape width. The distance (length of the tape between chucks) is set to 100 mm. After the tape sample is chucked, stress is gradually applied in the direction in which the sample is pulled. The pulling speed is set to 0.1 mm/min. From the change in the stress and the amount of elongation at this time, the Young's modulus is calculated using the following formula.

$$E(N/m^2) = ((\Delta N/S)/(\Delta x/L)) \times 10^6$$

ΔN: change in stress (N)

S: cross-sectional area of test piece ($mm^2$)

Δx: amount of elongation (mm))

L: distance between gripping jigs (mm)

The cross-sectional area S of the above measurement sample 10S is the cross-sectional area before the tensile operation, and is obtained as the product of the width of the measurement sample 10S (½ inch) and the thickness of the measurement sample 10S. As the range of tensile stress when performing measurement, a range of tensile stress of a linear region is set in accordance with the thickness of the magnetic tape MT or the like. Here, the stress range is set to 0.2 N to 0.7 N, and the change in stress (ΔN) and the amount of elongation (Δx) at this time are used for calculation. Note that the above measurement of the Young's modulus is performed at 25° C.±2° C. and 50% RH±5% RH.

(Young's Modulus in Longitudinal Direction of Base)

The Young's modulus in the longitudinal direction of the base 41 is favorably 7.8 GPa or less, more favorably 7.0 GPa or less, still more favorably 6.6 GPa or less, and particularly favorably 6.4 GPa or less. When the Young's modulus in the longitudinal direction of the base 41 is 7.8 GPa or less, the stretchability of the magnetic tape MT due to an external force further increases, and thus, the width of the magnetic tape MT can be adjusted more easily by tension adjustment. Therefore, it is possible to more appropriately suppress off-track and more accurately reproduce the data recorded on the magnetic tape MT. The lower limit value of the Young's modulus in the longitudinal direction of the base 41 is favorably 2.5 GPa or more, more favorably 3.0 GPa or more. When the lower limit value of the Young's modulus in the longitudinal direction of the base 41 is 2.5 GPa or more, it is possible to suppress a decrease in travelling stability.

The above Young's modulus in the longitudinal direction of the base 41 is obtained as follows. First, the magnetic tape MT housed in the cartridge 10 is unwound, and the magnetic tape MT is cut into a length of 180 mm at a position 30 m to 40 m in the longitudinal direction from the connection part 21 between the magnetic tape MT and the leader tape LT. Subsequently, the underlayer 42, the magnetic layer 43, and the back layer 44 are removed from the cut magnetic tape MT to obtain the base 41. The Young's modulus in the longitudinal direction of the base 41 is obtained using this base 41 in the same procedure as that for the above Young's modulus in the longitudinal direction of the magnetic tape MT.

The thickness of the base 41 occupies more than half of the thickness of the entire magnetic tape MT. Therefore, the Young's modulus in the longitudinal direction of the base 41 correlates with the difficulty of expansion and contraction of the magnetic tape MT due to an external force. The larger this value, the more difficult it is for the magnetic tape MT to expand and contract in the width direction due to an external force, and the smaller this value, the more easily the magnetic tape MT expands and contracts in the width direction due to an external force.

Note that although the Young's modulus in the longitudinal direction of the base 41 is a value relating to the longitudinal direction of the magnetic tape MT, it also correlates with the difficulty of expansion and contraction in the width direction of the magnetic tape MT. That is, the larger this value, the more difficult it is for the magnetic tape MT to expand and contract in the width direction due to an external force, and the smaller this value, the more easily the magnetic tape MT expands and contracts in the width direction due to an external force. Therefore, from the viewpoint of tension adjustment, it is advantageous for the Young's modulus in the longitudinal direction of the base 41 to be small as described above, i.e., 7.8 GPa or less.

(Average Number N of Conductive Particles Per 400 $\mu m^2$ of Magnetic Surface)

An average number N of conductive particles per 400 $\mu m^2$ of the magnetic surface is 50 or more. When the average number N of conductive particles per 400 $\mu m^2$ of the magnetic surface is less than 50, there is a possibility that the conductive particle 431 that functions as a solid lubricant is insufficient on the magnetic surface and the dynamic friction of the magnetic surface increases. For this reason, there is a possibility that the travelling reliability of the magnetic tape MT is reduced. The average number N of conductive particles per 400 $\mu m^2$ of the magnetic surface is favorably 113 or more, more favorably 150 or more, and still more favorably 200 or more from the viewpoint of reducing the dynamic friction of the magnetic surface. The average number N of conductive particles per 400 $\mu m^2$ of the magnetic surface is favorably 400 or less from the viewpoint of suppressing deterioration of electromagnetic conversion characteristics.

(Average Conductive Particle Area S on Magnetic Surface)

An average conductive particle area S on the magnetic surface is 35000 $nm^2$ or less. When the average conductive particle area S on the magnetic surface exceeds 35000 $nm^2$, there is a possibility that the output of a reproduction signal decreases. Therefore, there is a possibility that electromagnetic conversion characteristics deteriorate. Further, when the average conductive particle area S on the magnetic surface exceeds 35000 $nm^2$, there is a possibility that the conductive particle 431 is counted as an error. Therefore, there is a possibility that the error rate increases. The average conductive particle area S on the magnetic surface represents an average value of the area occupied by one conductive particle on the magnetic surface. The average conductive particle area S on the magnetic surface is favorably 30000 $nm^2$ or less, more favorably 26720 $nm^2$ or less, and more favorably 22000 $nm^2$ or less from the viewpoint of improving electromagnetic conversion characteristics.

(Average Conductive Particle Area Ratio $R_S$ on Magnetic Surface)

An average conductive particle area ratio $R_S$ on the magnetic surface is less than 2.00%. When the average conductive particle area ratio $R_S$ on the magnetic surface is 2.00% or more, the magnetic particle area ratio on the magnetic surface decreases, and thus, the electromagnetic conversion characteristics deteriorate. The average conductive particle area ratio $R_S$ on the magnetic surface represents an average value of the ratio of the total area of the conductive particles included in the magnetic surface to the area of the magnetic surface. The magnetic particle area ratio represents a ratio of the total area of magnetic particles included in the magnetic surface to the area of the magnetic surface. The average conductive particle area ratio $R_S$ on the magnetic surface is favorably 1.50% or less, more favorably 1.25% or less, and still more favorably 1.00% or less from the viewpoint of improving electromagnetic conversion characteristics.

(Average Number $N_{200}$ of Conductive Particles Having Particle Size of 200 nm or More)

An average number $N_{200}$ of conductive particles having a particle size $R_{TD}$ of 200 nm or more in the width direction of the magnetic tape MT is favorably 10 or more and 30 or less per 400 $\mu m^2$ of the magnetic surface, more favorably 10 or more and 25 or less per 400 $\mu m^2$ of the magnetic surface. When the average number $N_{200}$ of conductive particles having the particle size $R_{TD}$ of 200 nm or more is 10 or more, it is possible to further reduce the dynamic friction of the magnetic surface. When the average number $N_{200}$ of conductive particles having the particle size $R_{TD}$ of 200 nm or more is 30 or less, it is possible to further improve the electromagnetic conversion characteristics.

(Method of Measuring Average Number N of Conductive Particles, Average Conductive Particle Area S, Average Conductive Particle Area Ratio $R_S$, and Average Number $N_{200}$ of Conductive Particles)

The average number N of conductive particles, the average conductive particle area S, the average conductive particle area ratio $R_S$, and the average number $N_{200}$ of conductive particles are values calculated from the number of conductive particles that function as conductive points (i.e., a solid lubricant) on the magnetic surface. As described below, a C-AFM (Conductive Atomic Force Microscope) is used to observe the conductive points (bright spots). That is, the average number N of conductive particles, the average conductive particle area S, the average conductive particle area ratio $R_S$, and the average number $N_{200}$ of conductive particles are obtained from the measurement result of the C-AFM.

Each of the above average number N of conductive particles, average conductive particle area S, average conductive particle area ratio $R_S$, and average number $N_{200}$ of conductive particles is obtained as follows.

First, the magnetic tape MT housed in the cartridge 10 is unwound, and a sample is cut out randomly from the area (user data area) 24 m or more in the longitudinal direction from the connection part 21 between the magnetic tape MT and the leader tape LT. The sample is cut into a size that can be placed on a slide glass (e.g., a rectangle of approximately 12.65 mm×10 mm). Here, the reason why the sample is cut out from the area 24 m or more in the longitudinal direction from the connection part 21 between the magnetic tape MT and the leader tape LT is because the area 24 m or more is usually user data area (data recording area).

Next, the magnetic surface of the sample is measured at three points selected randomly from the sample using a C-AFM (Conductive Atomic Force Microscope) to obtain three current images. The C-AFM measurement conditions are shown below.

<C-AFM Measurement Conditions>

Measurement device: mid-sized probe microscope system AFM5500M (manufactured by Hitachi High-Technologies Corporation)

Measurement range: 20 μm×20 μm

Measurement mode: AFM/Current (Nano) (shape/current)

Cantilever: SI-DF3-R (both sides)

Bias voltage: 1.0 V (a) [Main window](at initial settings), (b) [Set menu of cantilever], and (c) [Device settings](when selecting tab of auxiliary parameter) when acquiring the current image using the C-AFM are as follows.

(a) [Main Window](at Initial Settings)

Details of measurement mode: Current (Naono)

Scan Z range: standard (b) [Set Menu of Cantilever]

Cantilever: SI-DF3-R (selection is the same whether SI-DF3-R/SI-DF3-R (both sides) is used)

Cantilever attachment: automatic

Cantilever laser spot: tip (c) [Device Settings](when Selecting Tab of Auxiliary Parameter)

<Image Measurement>

Number of prescans: 8

Number of dummy scans: 4

<I/V Amplifier>

Multiplier: 8th power

Multiplier (STM): 8th power

<Deflection Amount>

Unit: nm

<Approach>

Stop voltage: 0.100 V

Stop margin coefficient: 1.000

SIS retraction speed: 7.630 μm/sec

<Z Control>

Polarity of feedback control: positive

Minimum value of control voltage: —200.0 V

<Automatic Adjustment>

Oscillation state detection magnification: 1.70 times

Control state:

Program method: (detection reference: 15.00%), (correlation coefficient: 0.98)

Speed priority: (detection reference: 20.00%), (correlation coefficient: 0.95)

Force priority: (detection reference: 12.00%), (correlation coefficient: 0.97)

Amplitude adjustment coefficient: 60

Part A of FIG. 10 is a diagram showing an example of a measurement result of an AFM current image. Part B of FIG. 10 is a diagram showing an example of a measurement result of an AFM shape image. In the current image in Part A of FIG. 10, bright spots each represent the conductive particle 431 (i.e., the first protrusion 431A). It can be seen from Part A of FIG. 10 and Part B of FIG. 10 that while the conductive particle 431 included in the magnetic surface can be distinguished in the AFM current image, it is difficult to distinguish the conductive particle 431 included in the magnetic surface in the AFM shape image.

Next, a number n of conductive particles, a conductive particle total area $S_a$, and a conductive particle area ratio $r_S$ are calculated by analyzing each of the obtained current images using the C-AFM. Expanded particle analysis is selected as the analysis menu for the C-AFM. Settings for the particle analysis are as follows.

[Settings for Particle Analysis]

(Correction)

Tilt correction: not selected

Waviness removal: not selected

Order: 1

Filter 1 size: 3

Filter 1 size: 3

(Particle Extraction Method)

Threshold value: selected

Watershed: not selected (Particle Display Method)

Fill: selected

Contour line: not selected (Range of Normalized Particles)

1 μm (Measured Value Display)

Area, diameter, Z range, Z maximum value

Next, the average number N of conductive particles, the average conductive particle area S, the average conductive particle area ratio $R_S$, and the average number $N_{200}$ of conductive particles are calculated as follows using the number n of conductive particles, the conductive particle total area $S_a$, and the conductive particle area ratio $r_S$ calculated as described above using the C-AFM.

The numbers n of conductive particles acquired from the three current images are simply averaged (arithmetically averaged) to calculate the average number N of conductive particles.

The conductive particle total area $S_a$ acquired from the three current images are simply averaged (arithmetically averaged) to measure an average conductive particle total area $S_b$ and then, the average conductive particle total area $S_b$ is divided by the average number N of conductive particles to calculate the average conductive particle area S (=Sb/N).

The conductive particle area ratios $r_S$ acquired from the three current images are simply averaged (arithmetically averaged) to calculate the average conductive particle area ratio $R_S$.

The number $n_{200}$ of conductive particles of 200 nm or more is calculated from the granularity distribution acquired from the current image (granularity distribution of the particle size $R_{TD}$ in the width direction of the magnetic tape MT) and then, the numbers $n_{200}$ of conductive particles in the three current images are simply averaged (arithmetically averaged) to calculate the average number $N_{200}$ of conductive particles.

In recent technologies for producing magnetic tapes, the physical property value of the area 24 m or more in the longitudinal direction is set to a substantially constant value. Therefore, in the sample cut out randomly from the area 24 m or more in the longitudinal direction, if the average number N of conductive particles, the average conductive particle area S, the average conductive particle area ratio $R_S$, and the average number $N_{200}$ of conductive particles satisfy the above numerical ranges, it can be presumed that these numerical ranges are satisfied over substantially the entire magnetic tape MT.

However, in the magnetic tape in which the physical property value of the area 24 m or more in the longitudinal direction is not set to a substantially constant value, a sample is cut out from the section where the error rate is the maximum in the area 24 m or more in the longitudinal direction and the average number N of conductive particles, the average conductive particle area S, the average conductive particle area ratio $R_S$, and the average number $N_{200}$ of conductive particles are measured using the sample.

(Dynamic Friction Coefficient μ (250))

In the case where the dynamic friction coefficient between the surface of the magnetic layer 43 and the head unit 56 when the tension applied to the magnetic tape MT is 0.78 N is defined as μ, the dynamic friction coefficient μ (250) at the 250th travelling is favorably 0.60 or less, more favorably 0.55 or lees, still more favorably 0.50 or less, and particularly favorably 0.45 or less.

The dynamic friction coefficient μ (250) is obtained as follows. First, the magnetic tape MT housed in the cartridge 10 is unwound, and the magnetic tape MT having a ½ inch width is cut into a length of 250 mm at a position 30 m to 40 m in the longitudinal direction from the connection part 21 between the magnetic tape MT and the leader tape LT. Subsequently, as shown in Part A of FIG. 11, the magnetic tape MT having a ½ inch width is placed on two columnar guide rolls 73A and 73B, which are disposed spaced apart from each other in parallel and have one inch diameter, such that the magnetic surface comes into contact with them. The two guide rolls 73A and 73B are fixed to a hard plate-shaped member 76, which fixes their positional relationships.

Subsequently, the magnetic surface of the magnetic tape MT is brought into contact with a head block (for recording and reproduction) 74 such that a wrap angle θ(°)=20°. As the head block 74, a recording/reproducing head of an LTO4 drive manufactured by Hewlett Packard Enterprise Development LP (HPE) is used. The head block 74 is disposed at substantially the center between the guide rolls 73A and 73B. The head block 74 is movable attached to the plate-shaped member 76 such that the wrap angle θ can be changed. However, when the wrap angle θ (°) reaches 20°, the position of the head block 74 is fixed to the plate-shaped member 76 and thus, the positional relationship between the guide rolls 73A and 73B and the head block 74 is also fixed.

One end of the magnetic tape MT is connected to a movable strain gauge 71 via a jig 72. The magnetic tape MT is fixed to the jig 72 as shown in Part B of FIG. 11. A weight 75 with a mass of 80 g is connected to the other end of the magnetic tape MT. The weight 75 applies a tension of 80 gf (0.78 N) (To [N]) in the longitudinal direction of the magnetic tape MT. The movable strain gauge 71 is fixed on a stage 77. The positional relationship between the stage 77 and the plate-shaped member 76 is also fixed, which fixes the positional relationship between the guide rolls 73A and 73B, the head block 74, and the movable strain gauge 71.

The magnetic tape MT is caused to slide 60 mm toward the movable strain gauge 71 at 5 mm/s relative to the head block 74 (outward path) and slide 60 mm away from and the movable strain gauge 71 (return path). This reciprocation operation is repeated 250 times. Of these 250 reciprocation operations, the output value (voltage) of the movable strain gauge 71 is acquired 13 times from the start of 60 mm sliding to the end of the sliding on the 250th outward path and converted into T [N] on the basis of the linear relationship (described below) between the output value and the load acquired in advance. The 11 values excluding the 2 values of the first and last are simply averaged to obtain $T_{ave}$ [N]. Note that the measurement environment is maintained at 25° C.±2° C. and 50% RH±5% RH.

After that, the dynamic friction coefficient μ (250) is obtained by the following formula.

$$\mu(250) = \frac{1}{(\theta[°]) \times (\pi/180)} \times \ln\left(\frac{T_{ave}[N]}{T_0[N]}\right) \quad \text{(Math. 3)}$$

The above linear relationship is obtained as follows. That is, the output value (voltage) of the movable strain gauge 71 is obtained for each of a case where a load of 0.4 N is applied to the movable strain gauge 71 and a case where a load of 1.5 N is applied to the movable strain gauge 71. The linear relationship between the output value and the load is obtained from the two obtained output values and the above two loads. The output value (voltage) by the movable strain gauge 71 during sliding is converted into T [N] as described above using the linear relationship.

4 Method of Producing Magnetic Tape

Next, an example of the method of producing the magnetic tape MT having the above configuration will be described.

(Step of Preparing Paint)

First, non-magnetic particles, a binder, and the like are kneaded and dispersed in a solvent to prepare a coating material for forming an underlayer. Next, magnetic particles, the conductive particle 431, a binder, and the like are kneaded and dispersed in a solvent to prepare a coating material for forming a magnetic layer. For preparing the coating material for forming a magnetic layer and coating material for forming an underlayer, for example, the following solvent, dispersing apparatus, and kneading apparatus can be used.

Examples of the solvent to be used for preparing the above paint include, for example, a ketone solvent such as acetone, methyl ethyl ketone, methyl isobutyl ketone, and cyclohexanone, an alcohol solvent such as methanol, ethanol, and propanol, an ester solvent such as methyl acetate, ethyl acetate, butyl acetate, propyl acetate, ethyl lactate, and ethylene glycol acetate, an ether solvent such as diethylene glycol dimethyl ether, 2-ethoxyethanol, tetrahydrofuran, and dioxane, an aromatic hydrocarbon solvent such as benzene, toluene, and xylene, and a halogenated hydrocarbon solvent such as methylene chloride, ethylene chloride, carbon tetrachloride, chloroform, and chlorobenzene. These may be used alone or may be appropriately mixed and used.

Examples of the kneading apparatus to be used for preparing the above paint include, but not particularly limited to, a kneading apparatus such as a continuous twin-screw kneader, a continuous twin-screw kneader capable of performing dilution in multiple stages, a kneader, a pressure kneader, and a roll kneader. Examples of the dispersing apparatus to be used for preparing the above paint include, but particularly not limited to, a dispersing apparatus such as a roll mill, a ball mill, a horizontal sand mil, a perpendicular sand mil, a spike mill, a pin mill, a tower mill, a pearl mill (e.g., "DCP mill" manufactured by Eirich Co., Ltd.), a homogenizer, and an ultrasonic disperser.

(Application Process)

Next, the coating material for forming an underlayer is applied to one main surface of the base 41 and dried to form the underlayer 42. Subsequently, the coating material for forming a magnetic layer is applied to this underlayer 42 and dried to form the magnetic layer 43 on the underlayer 42. Note that during drying, the magnetic field of the magnetic particles is oriented in the thickness direction of the base 41 by, for example, a solenoid coil. Further, during drying, the magnetic field of the magnetic particles may be directed in the travelling direction (longitudinal direction) of the base 41 and then directed in the thickness direction of the base 41 by, for example, a solenoid coil. By performing processing of orienting the magnetic particles in the longitudinal direction in this way, it is possible to further improve the degree of perpendicular orientation (i.e., the squareness ratio S1) of the magnetic particles. After forming the magnetic layer 43, the back layer 44 is formed on the other main surface of the base 41. In this way, the magnetic tape MT is obtained.

The squareness ratios S1 and S2 are set to desired values by adjusting, for example, the strength of the magnetic field to be applied to the coating film of the coating material for forming a magnetic layer, the concentration of the solid content in the coating material for forming a magnetic layer, and the drying conditions (drying temperature and drying time) of the coating film of the coating material for forming a magnetic layer. The strength of the magnetic field to be applied to the coating film is favorably two or more times and three or less times the coercive force of the magnetic particles. In order to further increase the squareness ratio S1 (i.e., in order to further decrease the squareness ratio S2), it is favorable to improve the dispersion state of the magnetic particles in the coating material for forming a magnetic layer. Further, in order to further increase the squareness ratio S1, it is also effective to magnetize the magnetic particles before the coating material for forming a magnetic layer enters an orientation device for orienting the magnetic field of the magnetic particles. Note that the above methods of adjusting the squareness ratios S1 and S2 may be used alone, or two or more of them may be used in combination.

(Curing Process)

Next, the magnetic tape MT is wound into a roll, and then, the magnetic tape MT in this state is subjected to heat treatment to cure the underlayer 42 and the magnetic layer 43.

(Calendaring Process)

Next, the obtained magnetic tape MT is calendared to smooth the magnetic surface.

(Demagnetizing Step and Step of Writing Servo Pattern)

Next, as necessary, the magnetic tape MT may be demagnetized, and then, a servo pattern may be written to the magnetic tape MT.

(Cutting Process)

Next, the magnetic tape MT is cut into a predetermined width (e.g., ½ inch width). In this way, the magnetic tape MT is obtained.

(Methods of Adjusting Average Number N of Conductive Particles, Average Conductive Particle Area S, Average Conductive Particle Area Ratio $R_S$, and Average Number $N_{200}$ of Conductive Particles)

The above average number N of conductive particles, average conductive particle area S, average conductive particle area ratio $R_S$, and average number $N_{200}$ of conductive particles can be adjusted by, for example, adjusting at least one of the number of conductive particles to be blended in the coating material for forming a magnetic layer, the average particle size of the conductive particles, or the amount of conductive particles to be blended.

The above average number N of conductive particles, average conductive particle area S, average conductive particle area ratio $R_S$, and average number $N_{200}$ of conductive particles can also be adjusted by, for example, at least one of the temperature of calendaring, the thickness of the magnetic layer 43, or the drying temperature of the magnetic layer 43. For example, as the temperature of calendaring increases, the conductive particles tend to protrude from the magnetic surface. As the thickness of the magnetic layer 43 increases, the protrusion of the conductive particle 431 from the magnetic surface tends to be suppressed. As the drying temperature of the magnetic layer 43 increases, the conductive particles tend to protrude from the magnetic surface.

5 Operation and Effect

As described above, in the magnetic tape MT according to an embodiment, the average number N of conductive particles per 400 $\mu m^2$ of the surface of the magnetic layer 43 is 50 or more, the average conductive particle area S on the surface of the magnetic layer 43 is 35000 $nm^2$ or less, and the average conductive particle area ratio $R_S$ on the surface of the magnetic layer 43 is less than 2.0%. As a result, it is possible to reduce the dynamic friction of the surface of the magnetic layer 43 and achieve favorable electromagnetic conversion characteristics.

As shown in FIG. 6, in the case where the servo stripes 113 of the A burst 111A and the B burst 111B are asymmetric and the servo stripes 113 of the C burst 112C and the D burst 112D are asymmetric, assumption is made that the head unit 56 is kept inclined with respect to the axis Ax parallel to the width direction of the magnetic tape MT during recording and reproduction of the magnetic tape MT. In the magnetic tape MT according to an embodiment, it is possible to reduce the dynamic friction of the surface of the magnetic layer 43 and achieve favorable electromagnetic conversion characteristics even in the case where the head unit 56 that is kept inclined in this way is used.

6 Modified Example

Although the case where the magnetic tape cartridge is the one-reel type cartridge 10 has been described in the above one embodiment, the magnetic tape cartridge may be a two-reel type cartridge.

FIG. 12 is an exploded perspective view showing an example of a configuration of a two-reel type the cartridge 221. The cartridge 221 includes an upper half 202 formed of a synthetic resin, a transparent window member 223 that is fitted into and fixed to a window portion 202*a* that is opened on the upper surface of the upper half 202, a reel holder 222 that is fixed to the inside of the upper half 202 and prevents reels 206 and 207 from floating, a lower half 205 corresponding to the upper half 202, the reels 206 and 207 housed in the space formed by combining the upper half 202 and the lower half 205, the magnetic tape MT wound on the reels 206 and 207, a front lid 209 that closes a front-side opening formed by combining the upper half 202 and the lower half 205, and a back lid 209A that protects the magnetic tape MT exposed in this front-side opening.

The reels 206 and 207 are for winding the magnetic tape MT. The reel 206 includes a lower flange 206*b* that includes a cylindrical hub portion 206*a* in the center around which the magnetic tape MT is wound, an upper flange 206*c* having substantially the same size as the lower flange 206*b*, and a reel plate 211 sandwiched between the hub portion 206*a* and the upper flange 206*c*. The reel 207 has a configuration similar to that of the reel 206.

The window member 223 is provided with mounting holes 223*a* for mounting the reel holders 222 at positions corresponding to the reels 206 and 207, the reel holders 222 being reel holding means that prevents these reels from floating. The magnetic tape MT is similar to the magnetic tape MT according to the first embodiment.

EXAMPLES

Although the present disclosure will be specifically described with reference to examples, the present disclosure is not limited to these Examples.

In the following Examples and Comparative Examples, the average aspect ratio of the magnetic particles, the average particle volume of the magnetic particles, the average thickness of the magnetic tape, the average thickness of the magnetic layer, the average thickness of the underlayer, the average thickness of the back layer, the average number N of conductive particles per 400 $\mu m^2$ of the magnetic surface, the average conductive particle area S on the magnetic surface, the average conductive particle area ratio $R_S$ on the magnetic surface, the average number $N_{200}$ of conductive particles having the particle size of 200 nm or more in the width direction of the magnetic tape, the squareness ratio S1 of the magnetic layer in the perpendicular direction of the magnetic tape, and the squareness ratio S2 of the magnetic layer in the longitudinal direction of the magnetic tape are values obtained by the measurement methods described in the above one embodiment.

(1) Study on Relationship Between Characteristics of Magnetic Surface and Friction and Electromagnetic Conversion Characteristics Magnetic tapes having different characteristics of the magnetic surface were prepared and the relationship between the characteristics of the magnetic surface and friction and electromagnetic conversion characteristics was studied.

Example 1

(Process of Preparing Coating Material for Forming Magnetic Layer)

A coating material for forming a magnetic layer was prepared as follows. First, a first composition of the following formulation was kneaded with an extruder. Next, the kneaded first composition and a second composition of the following formulation were added to a stirring tank including a dispersion device to perform preliminary mixing. Subsequently, dyno mill mixing was further performed and filter treatment was performed to prepare a coating material for forming a magnetic layer.

(First Composition)

Barium ferrite ($BaFe_{12}O_{19}$) magnetic powder (hexagonal plate shape, average aspect ratio of 3.0, average particle volume of 1200 $nm^3$): 100 parts by mass Vinyl chloride resin (formulation of the resin solution: 30 mass % of a vinyl chloride resin, 70 mass % of a cyclohexanone solution): 35 parts by mass (The Degree of Polymerization of 300, Number Average Molecular Weight Mn=10000, Including $OSO_3K$=0.07 Mmol/g, Secondary OH=0.3 Mmol/g as Polar Groups)

Polyurethane resin (resin solution: the amount of blended polyurethane resin 30 mass %, the amount of blended cyclohexanone 70 mass %): 15 parts by mass (Polyurethane Resin: Number Average Molecular Weight Mn=25000, Glass Transition Temperature Tg=110° C.)

Aluminum oxide powder: 4 parts by mass ($\alpha$-$Al_2O_3$, average particle size of 0.1 $\mu m$)

(Second Composition)

Carbon black (manufactured by Tokai Carbon Co., Ltd., product name: SEAST S having an arithmetic average particle diameter of 70 nm): 1.5 parts by mass Polyurethane resin (resin solution: the amount of blended polyurethane resin 30 mass %, the amount of blended cyclohexanone 70 mass %): 5.56 parts by mass (Polyurethane Resin: Number Average Molecular Weight Mn=25000, Glass Transition Temperature Tg=110° C.)

n-butyl stearate: 2 parts by mass

Methyl ethyl ketone: 121.0 parts by mass

Toluene: 121.0 parts by mass

Cyclohexanone: 116.0 parts by mass

Finally, a polyisocyanate (product name: Coronate L, manufactured by TOSOH CORPORATION): 3.3 parts by mass and stearic acid: 2 parts by mass were added as curing agents to the coating material for forming a magnetic layer prepared as described above.

(Process of Preparing Coating Material for Forming Underlayer)

A coating material for forming an underlayer was prepared as follows. First, a third composition of the following formulation was kneaded with an extruder. Next, the kneaded third composition and a fourth composition of the following formulation were added to a stirring tank including a dispersion device to perform preliminary mixing. Subsequently, dyno mill mixing was further performed and filter treatment was performed to prepare a coating material for forming an underlayer.

(Third Composition)

Acicular iron oxide powder: 100 parts by mass ($\alpha$-$Fe_2O_3$, Average Major Axis Length of 0.11 μm)

Vinyl chloride resin (formulation of the resin solution: 30 mass % of a vinyl chloride resin, 70 mass % of cyclohexanone): 46 parts by mass (Degree of Polymerization of 300, Number Average Molecular Weight Mn=10000, Including $OSO_3K$=0.07 Mmol/g, Secondary OH=0.3 Mmol/g as Polar Groups)

Aluminum oxide powder: 4 parts by mass ($\alpha$-$Al_2O_3$, average particle size of 0.1 μm)

(Average Particle Size of 20 nm)

(Fourth Composition)

Carbon black: 35 parts by mass (manufactured by ASAHI CARBON CO., LTD., product name: #80)

Polyurethane resin (resin solution: the amount of blended polyurethane resin 30 mass %, the amount of blended cyclohexanone 70 mass %): 50 parts by mass (Polyurethane Resin: Number Average Molecular Weight Mn=25000, Glass Transition Temperature Tg=70° C.)

n-butyl stearate: 2 parts by mass

Methyl ethyl ketone: 108.2 parts by mass

Toluene: 108.2 parts by mass

Cyclohexanone: 100.0 parts by mass

Finally, a polyisocyanate (product name: Coronate L, manufactured by TOSOH CORPORATION): 2.49 parts by mass and stearic acid: 2 parts by mass were added as curing agents to the coating material for forming an underlayer prepared as described above.

(Process of Preparing Coating Material for Forming Back Layer)

A coating material for forming a back layer was prepared as follows. A coating material for forming a back layer was prepared by mixing the following raw material in a stirring tank including a dispersion device and performing filter treatment thereon.

Carbon black (manufactured by ASAHI CARBON CO., LTD., product name: #80): 100 parts by mass Polyester polyurethane: 100 parts by mass (manufactured by Nippon Polyurethane Co., Ltd., product name: N-2304)

Methyl ethyl ketone: 500 parts by mass

Toluene: 400 parts by mass

Cyclohexanone: 100 parts by mass

Polyisocyanate (product name: Coronate L, manufactured by TOSOH CORPORATION): 10 parts by mass (Application Process)

The coating material for forming a magnetic layer and coating material for forming an underlayer prepared as described above were used to form an underlayer and a magnetic layer as follows on one main surface of a long polyethylene naphthalate film (hereinafter, referred to as a "PEN film") having an average thickness of 4.0 μm, which is a non-magnetic support. First, the coating material for forming an underlayer was applied to one main surface of the PEN film and dried to form an underlayer such that the average thickness was 800 nm after calendaring. Next, the coating material for forming a magnetic layer was applied to the underlayer and dried to form a magnetic layer such that the average thickness was 70 nm after calendaring. During drying of the coating material for forming a magnetic layer, the magnetic field of the magnetic particles was oriented in the thickness direction of the film by a solenoid coil. As a result, the squareness ratio S1 in the perpendicular direction (thickness direction) of the magnetic tape was set to 65% and the squareness ratio S2 in the longitudinal direction of the magnetic tape was set to 38%. Subsequently, the coating material for forming a back layer was applied to the other main surface of the PEN film and dried to form a back layer such that the average thickness was 0.3 μm after calendaring. In this way, a magnetic tape was obtained.

(Curing Process)

The magnetic tape was wound into a roll, and then, the magnetic tape in this state was subjected to heat treatment at 70° C. for 48 hours to cure the underlayer and the magnetic layer.

(Calendaring Process)

Calendaring was performed to smooth the surface of the magnetic layer. At this time, the calendaring temperature was set to 100° C. and the calendaring pressure was set to 200 kg/cm.

(Cutting Process)

The magnetic tape obtained as described above was cut into a ½ inch (12.65 mm) width. In this way, a magnetic tape that had characteristics of the magnetic surface shown in Table 1 and an average thickness of 5.2 μm was obtained.

Example 2

In the application process, a magnetic layer was formed such that the average thickness after calendaring was 60 nm. In the application process, an underlayer was formed such that the average thickness after calendaring was 600 nm. A magnetic tape that had characteristics of the magnetic surface shown in Table 1 and an average thickness of 5.0 μm was obtained in the same manner as in Example 1 except for the above.

Example 3

In the process of preparing a coating material for forming a magnetic layer, the amount of carbon black (manufactured by Tokai Carbon Co., Ltd., product name: SEAST S having an arithmetic average particle diameter of 70 nm) blended in the second composition was changed to 1.0 part by mass. In the application process, a magnetic layer was formed such that the average thickness after calendaring was 80 nm. A magnetic tape that had characteristics of the magnetic surface shown in Table 1 and an average thickness of 5.2 μm was obtained in the same manner as in Example 1 except for the above.

Example 4

In the process of preparing a coating material for forming a magnetic layer, the amount of carbon black (manufactured by Tokai Carbon Co., Ltd., product name: SEAST S having an arithmetic average particle diameter of 70 nm) blended in the second composition was changed to 1.0 part by mass. In the application process, a magnetic layer was formed such that the average thickness after calendaring was 60 nm. In the application process, an underlayer was formed such that the average thickness after calendaring was 600 nm. A magnetic tape that had characteristics of the magnetic surface shown in Table 1 and an average thickness of 5.0 μm was obtained in the same manner as in Example 1 except for the above.

Comparative Example 1

In the process of preparing a coating material for forming a magnetic layer, instead of carbon black (manufactured by Tokai Carbon Co., Ltd., product name: SEAST S having an arithmetic average particle diameter of 70 nm) in the second composition: 1.5 parts by mass, carbon black (manufactured by Tokai Carbon Co., Ltd., product name: SEAST TA having an arithmetic average particle diameter of 120 nm): 2.0 parts by mass was used. In the application process, a PEN film having an average thickness of 4.5 m was used as a non-magnetic support. In the application process, an underlayer was formed such that the average thickness after calendaring was 700 nm. A magnetic tape that had characteristics of the magnetic surface shown in Table 1 and an average thickness of 5.6 μm was obtained in the same manner as in Example 1 except for the above.

Comparative Example 2

In the application process, a PEN film having an average thickness of 4.2 m was used as a non-magnetic support. In the calendaring process, the calendaring temperature was set to 115° C. A magnetic tape that had characteristics of the magnetic surface shown in Table 1 and an average thickness of 5.3 μm was obtained in the same manner as in Comparative Example 2 except for the above.

Comparative Example 3

In the process of preparing a coating material for forming a magnetic layer, the amount of carbon black (manufactured by Tokai Carbon Co., Ltd., product name: SEAST S having an arithmetic average particle diameter of 70 nm) blended in the second composition was changed to 2.5 parts by mass. In the application process, a magnetic layer was formed such that the average thickness after calendaring was 80 nm. In the application process, an underlayer was formed such that the average thickness after calendaring was 1100 nm. In the application process, a back layer was formed such that the average thickness after calendaring was 0.4 μm. A magnetic tape that had characteristics of the magnetic surface shown in Table 1 and an average thickness of 5.6 μm was obtained in the same manner as in Example 1 except for the above.

Comparative Example 4

In the process of preparing a coating material for forming a magnetic layer, the amount of carbon black (manufactured by Tokai Carbon Co., Ltd., product name: SEAST S having an arithmetic average particle diameter of 70 nm) blended in the second composition was changed to 2.0 parts by mass. In the application process, a magnetic layer was formed such that the average thickness after calendaring was 80 nm. Further, in the calendaring process, the calendaring temperature was set to 115° C. A magnetic tape that had characteristics of the magnetic surface shown in Table 1 and an average thickness of 5.2 μm was obtained in the same manner as in Example 1 except for the above.

Comparative Example 5

In the process of preparing a coating material for forming a magnetic layer, the amount of carbon black (manufactured by Tokai Carbon Co., Ltd., product name: SEAST S having an arithmetic average particle diameter of 70 nm) blended in the second composition was changed to 2.0 parts by mass. In the application process, a magnetic layer was formed such that the average thickness after calendaring was 80 nm. A magnetic tape that had characteristics of the magnetic surface shown in Table 1 and an average thickness of 5.2 μm was obtained in the same manner as in Example 1 except for the above.

[Evaluation]

The magnetic tapes obtained as described above were evaluated as follows.

(Dynamic Friction Coefficient μ (250))

The dynamic friction coefficient μ (250) of the magnetic tape was measured by the method of measuring the dynamic friction coefficient μ (250) described in the above embodiment.

The results are shown in Table 1. Note that in the case where the travelling of the magnetic tape stopped when the number of times of travelling was less than 250 due to an increase in the dynamic friction coefficient μ, the number of times of travelling at which the travelling of the magnetic tape stopped was described. Specifically, in Table 1, STOP (203) indicates that the travelling of the magnetic tape stopped at the 203rd time due to an increase in the dynamic friction coefficient μ, and STOP (45) indicates that the travelling of the magnetic tape stopped at the 45th time due to an increase in the dynamic friction coefficient μ.

(Electromagnetic Conversion Characteristics)

First, a reproduction signal of the magnetic tape was obtained using a loop tester (manufactured by Microphysics). The conditions for acquiring the reproduction signal are shown below.

Head: GMR

Headspeed: 1.85 m/s

Signal: single recording frequency of 10 MHz (as a 2T half Nyquist frequency)

Recording current: optimal recording current

Considering signal processing, measurement was performed at 2T (92.5 nm) assuming a bit length of 46.25 nm.

Next, the reproduction signal was captured by a spectrum analyzer (spectrum analyzer) with a span of 0 to 20 MHz (resolution band width=100 kHz, VBW=30 kHz). Next, the peak of the captured spectrum was taken as a signal amount S, the floor noise excluding the peak was integrated from 3 MHz to 20 MHz to obtain a noise amount N, and a ratio S/N of the signal amount S and the noise amount N was obtained as an SNR (Signal-to-Noise Ratio). Next, the obtained SNR was converted into a relative value (dB) with reference to the SNR in Comparative Example 5 as a reference medium. The results are shown in Table 1.

TABLE 1

| | Respective layers of magnetic tape | | | | | Characteristics of magnetic surface | | | | Evaluation result | |
|---|---|---|---|---|---|---|---|---|---|---|---|
| | Average thickness of magnetic layer [nm] | Average thickness of underlayer [nm] | Average thickness of base [μm] | Average thickness of back layer [μm] | Average thickness of magnetic tape [μm] | Average number of conductive particles N [pieces/ 400 $\mu m^2$] | Average conductive particle area S [$nm^2$] | Average conductive particle area ratio Rs [%] | Average number of conductive particles having width of 200 nm $N_{200}$ [pieces] | LTO G4 Head Dynamic friction coefficient μ (250Pass) | SNR [dB] |
| Example 1 | 70 | 800 | 4.0 | 0.3 | 5.2 | 261 | 20690 | 1.47 | 13 | 0.45 | 0.2 |
| Example 2 | 60 | 600 | 4.0 | 0.3 | 5.0 | 113 | 26720 | 0.73 | 12 | 0.44 | 0.6 |
| Example 3 | 80 | 800 | 4.0 | 0.3 | 5.2 | 269 | 22070 | 1.50 | 22 | 0.57 | 0.3 |
| Example 4 | 60 | 600 | 4.0 | 0.3 | 5.0 | 130 | 24660 | 1.00 | 10 | 0.53 | 0.7 |
| Comparative Example 1 | 70 | 700 | 4.5 | 0.3 | 5.6 | 26 | 46300 | 0.34 | 6 | STOP(203) | −1.0 |
| Comparative Example 2 | 70 | 700 | 4.2 | 0.3 | 5.3 | 46 | 36840 | 0.39 | 8 | STOP(45) | −0.9 |
| Comparative Example 3 | 80 | 1100 | 4.0 | 0.4 | 5.6 | 375 | 27280 | 2.62 | 35 | 0.36 | −1.0 |
| Comparative Example 4 | 80 | 800 | 4.0 | 0.3 | 5.2 | 515 | 21730 | 2.68 | 32 | 0.43 | −0.2 |
| Comparative Example 5 | 80 | 800 | 4.0 | 0.3 | 5.2 | 442 | 18000 | 2.00 | 24 | 0.3 | 0.0 |

The following can be seen from the above evaluation results.

When the average number N of conductive particles per 400 $\mu m^2$ of the surface of the magnetic layer is 50 or more, the average conductive particle area S on the magnetic surface is 35000 $nm^2$ or less, and the average conductive particle area ratio $R_S$ on the magnetic surface is less than 2.0%, it is possible to reduce the dynamic friction coefficient μ of the magnetic surface and achieve a favorable SNR (electromagnetic conversion characteristics) (Examples 1 to 4).

When the average number N of conductive particles per 400 $\mu m^2$ of the surface of the magnetic layer is less than 50, the lubricating effect of the conductive particles is insufficient, and thus, the dynamic friction coefficient μ of the magnetic surface increases (Comparative Examples 1 and 2).

When the average conductive particle area S on the magnetic surface exceeds 35000 $nm^2$, a favorable SNR (electromagnetic conversion characteristics) cannot be achieved (Comparative Examples 1 and 2).

When the average conductive particle area ratio $R_S$ on the magnetic surface is 2.0% or more, a favorable SNR (electromagnetic conversion characteristics) cannot be achieved (Comparative Examples 3 to 5).

(2) Study on Difference Between Measurement Results of Average Number N of Conductive Particles by C-AFM and Measurement Results of Average Number Nc of Carbon Particles by FE-SEM The magnetic surface of the magnetic tape was observed using a C-AFM and an FE-SEM to study the difference between measurement results of the average number N of conductive particles by a C-AFM and observation results of the average number Nc of carbon particles by an FE-SEM.

Comparative Example 6

As Comparative Example 6, a commercially available magnetic tape conforming to the LTO-7 standard was prepared.

[Evaluation]

The magnetic tapes according to Comparative Examples 1, 3, and 6 were evaluated as follows.

(Evaluation of Average Number N of Conductive Particles by C-AFM)

The average number N of conductive particles was measured by the method of measuring the average number N of conductive particles described in the above embodiment. The results are shown in Table 2.

(Evaluation of Average Number Nc of Carbon Particles by FE-SEM)

First, three samples was cut out from the magnetic tape in the same manner as in the method of measuring the average number N of conductive particles by a C-AFM. Next, the magnetic surface of each sample was imaged using an FE-SEM (Field Emission Scanning Electron Microscope) to obtain an FE-SEM image. The FE-SEM measurement conditions are shown below.

<FE-SEM Measurement Conditions>

Apparatus: HITACHI 5-4800 (manufactured by Hitachi High-Technologies Corporation)

Field of view: 20 μm×20 μm

Acceleration voltage: 5 kV

Measurement magnification: 25000 times

In the obtained FE-SEM image, the type of particle forming the protrusion on the magnetic surface was identified using the difference in luminance caused by the difference in the amount of secondary electrons emitted by the carbon particle (carbon black) and the abrasive particle (alumina particle). Specifically, the obtained FE-SEM image was binarized using image processing software Image J under each of the two processing conditions described below. An abrasive particle having high luminance is observed as a white dot in the FE-SEM image, and a carbon particle having a low luminance is observed as a black dot in the FE-SEM image. Information regarding the number of carbon particles and the number of abrasive particles was acquired from the image obtained by the binarization processing.

<Binarization Conditions for Acquiring Information Regarding Carbon Particle>

Software: Image J Ver 1.44p

Binarization threshold value: Threshold (0.65)

Binarization target size: 0.002 μm-infinity

<Binarization Conditions for Acquiring Information Regarding Abrasive Particle>

Software: Image J Ver 1.44p

Binarization threshold value: Threshold (220,255)

Binarization target size: 0.001 μm-infinity

The numbers of carbon particles acquired from the three FE-SEM images are simply averaged (arithmetically averaged) to calculate the average number Nc of carbon particles. The results are shown in Table 2.

(Friction)

The friction of the magnetic tape was measured by the method of measuring friction described in the above embodiment. The results are shown in Table 2. Note that in the case where the travelling of the magnetic tape stopped when the number of times of travelling was less than 250 due to an increase in the dynamic friction coefficient μ, the number of times of travelling at which the travelling of the magnetic tape stopped was described. Specifically, in Table 2, STOP (156) indicates that the travelling of the magnetic tape stopped at the 156th time due to an increase in the dynamic friction coefficient μ, and STOP (203) indicates that the travelling of the magnetic tape stopped at the 203rd time due to an increase in the dynamic friction coefficient μ.

TABLE 2

| | Average number of conductive particles by FE-SEM $N_C$ [pieces/400 $\mu m^2$] | Average number of conductive particles by C-AFM N [pieces/400 $\mu m^2$] | LTO G4 Head Dynamic friction coefficient μ (250 Pass) |
|---|---|---|---|
| Comparative Example 3 | 560 | 375 | 0.36 |
| Comparative Example 6 | 280 | 22 | STOP(156) |
| Comparative Example 1 | 80 | 26 | STOP(203) |

The measurement results of the average number N of conductive particles by the C-AFM and the measurement results of the average number Nc of carbon particles by the FE-SEM are significantly different from each other. This is because the FE-SEM counts carbon particles that do not exhibit effects as solid lubricants in addition to carbon particles that exhibit effects as solid lubricants while the C-AFM counts carbon particles that exhibit effects as solid lubricants.

In the FE-SEM, even in the case where the carbon particle forming the protrusion on the magnetic surface is covered with an organic matter such as a binder, the incident electron beam and the reflected electron beam pass through the organic matter such as a binder. For this reason, there is a possibility that a carbon particle that is covered with an organic matter such as a binder and does not exhibit effects as a solid lubricant is also counted.

Meanwhile, the C-AFM is capable of appropriately measuring the number of carbon particles that are effective as solid lubricants, excluding carbon particles covered with an organic matter such as a binder.

The average number Nc of carbon particles measured by the FE-SEM in Comparative Example 1 is ⅓ or less of the average number Nc of carbon particles measured by the FE-SEM in Comparative Example 6. However, the travelling stop number (203) in Comparative Example 1 is greater than the travelling stop number (156) in Comparative Example 6. This result reveals that the average number Nc of carbon particles measured by the FE-SEM does not appropriately indicate the number of carbon particles that function as solid lubricants.

Meanwhile, the average number N of conductive particles measured by the C-AFM in Comparative Example 1 is greater than the average number N of conductive particles measured by the C-AFM in Comparative Example 6. This result corresponds to the relationship between the travelling stop number (203) in Comparative Example 1 and the travelling stop number (156) in Comparative Example 6. This result reveals that the average number N of conductive particles measured by the C-AFM appropriately indicates the number of carbon particles that function as solid lubricants.

Although embodiments and modified examples of the present disclosure have been specifically described above, the present disclosure is not limited to the above embodiments and modified examples, and various modifications can be made on the basis of the technical idea of the present disclosure. For example, the configurations, methods, processes, shapes, materials, numerical values, and the like mentioned in the above embodiments and modified examples are merely examples, and configurations, methods, processes, shapes, materials, numerical values, and the like different from these may be used as necessary. The configurations, methods, processes, shapes, materials, numerical values, and the like of the above embodiments and modified examples can be combined with each other without departing from the essence of the present disclosure.

The chemical formulae of compounds and the like exemplified in the above embodiments and modified examples are representative ones, and they are not limited to the stated valances and the like as long as they are general names of the same compounds. In the numerical ranges described in stages in the above embodiments and modified examples, the upper limit value or the lower limit value in the numerical range of one stage may be replaced with the upper limit value or the lower limit value in the numerical range of another stage. The materials exemplified in the above embodiments and modified examples can be used alone, or two or more of them can be used in combination, unless otherwise specified.

Further, the present disclosure may also take the following configurations.

(1) A tape-shaped magnetic recording medium, including:

a base; and a magnetic layer, the magnetic layer containing a conductive particle, an average thickness of the magnetic recording medium being 5.3 μm or less, an average number of conductive particles per 400 $\mu m^2$ of a surface of the magnetic layer being 50 or more, an average conductive particle area of the surface of the magnetic layer being 35000 $nm^2$ or less, an average conductive particle area ratio of the surface of the magnetic layer being less than 2.00%.

(2) The magnetic recording medium according to (1), in which an average number of conductive particles having a particle size of 200 nm or more in a width direction of the magnetic recording medium per 400 $\mu m^2$ of the surface of the magnetic layer is 10 or more and 30 or less.

(3) The magnetic recording medium according to (1) or (2), in which
the average number of conductive particles per 400 $\mu m^2$ of the surface of the magnetic layer is 113 or more.
(4) The magnetic recording medium according to any one of (1) to (3), in which
the average conductive particle area of the surface of the magnetic layer is 26720 $nm^2$ or less.
(5) The magnetic recording medium according to any one of (1) to (4), in which
the average conductive particle area ratio of the surface of the magnetic layer is 1.50% or less.
(6) The magnetic recording medium according to any one of (1) to (5), in which
the conductive particle includes a carbon particle.
(7) The magnetic recording medium according to any one of (1) to (6), in which
the magnetic layer includes a plurality of protrusions formed by the conductive particle on the surface thereof.
(8) The magnetic recording medium according to any one of (1) to (7), in which
the magnetic layer has a servo pattern,
the servo pattern has a plurality of first magnetized regions and a plurality of second magnetized regions, and
the plurality of first magnetized regions and the plurality of second magnetized regions are asymmetric with respect to an axis parallel to a width direction of the magnetic recording medium.
(9) The magnetic recording medium according to (8), in which
an inclination angle of the first magnetized region with respect to the axis and an inclination angle of the second magnetized region with respect to the axis are different from each other, and
of the inclination angle of the first magnetized region and the inclination angle of the second magnetized region, the larger inclination angle is 180 or more and 28° or less.
(10) The magnetic recording medium according to any one of (1) to (9), in which
the magnetic layer is configured to be capable of recording a signal with a data track width of 800 nm or less and a bit length of 46 nm or less.
(11) The magnetic recording medium according to any one of (1) to (10), further including
an underlayer,
the average thickness of the underlayer being 900 nm or less.
(12) The magnetic recording medium according to any one of (1) to (11), in which
the average thickness of the magnetic layer is 80 nm or less.
(13) The magnetic recording medium according to any one of (1) to (12), in which
an average thickness of the base is 4.4 μm or less.
(14) The magnetic recording medium according to any one of (1) to (13), in which
the magnetic layer includes a magnetic particle, and
the magnetic particle contains hexagonal ferrite, ε-iron oxide, or Co-containing spinel ferrite.
(15) The magnetic recording medium according to any one of (1) to (14), in which
the average number of conductive particles, the average conductive particle area, and the average conductive particle area ratio are obtained from a measurement result by a C-AFM (Conductive Atomic Force Microscope).
(16) A cartridge, including:
the magnetic recording medium according to any one of (1) to (15).

REFERENCE SIGNS LIST

10, 221 cartridge
11 cartridge memory
31 antenna coil
32 rectification/power-supply circuit
33 clock circuit
34 detection/modulation circuit
35 controller
36 memory
36A first storage region
36B second storage region
41 base
42 underlayer
43 magnetic layer
44 back layer
56 head unit
56A, 56B servo read head
110 servo frame
111 servo subframe 1
111A A burst
111B B burst
112 servo subframe 2
112C C burst
112D D burst
113 servo stripe
431 conductive particle
431A first protrusion
432 abrasive particle
432B second protrusion
MT magnetic tape
SB servo band
DB data bind

The invention claimed is:

1. A tape-shaped magnetic recording medium, comprising:
a base; and
a magnetic layer,
the magnetic layer including conductive particles,
an average thickness of the magnetic recording medium being 5.3 μm or less,
an average number of conductive particles per 400 $\mu m^2$ of a surface of the magnetic layer being 50 or more,
an average conductive particle area of the surface of the magnetic layer being 35000 $nm^2$ or less,
an average conductive particle area ratio of the surface of the magnetic layer being less than 2.00%,
wherein
an average number of conductive particles having a particle size of 200 nm or more in a width direction of the magnetic recording medium per 400 $\mu m^2$ of the surface of the magnetic layer is 10 or more and 30 or less.

2. The magnetic recording medium according to claim 1, wherein
the magnetic layer includes a magnetic particle, and
the magnetic particle includes hexagonal ferrite, ε-iron oxide, or Co-containing spinel ferrite.

3. The magnetic recording medium according to claim 1, wherein the average number of conductive particles per 400 μm$^2$ of the surface of the magnetic layer is 113 or more.

4. The magnetic recording medium according to claim 1, wherein the average conductive particle area of the surface of the magnetic layer is 26720 nm$^2$ or less.

5. The magnetic recording medium according to claim 1, wherein the average conductive particle area ratio of the surface of the magnetic layer is 1.50% or less.

6. The magnetic recording medium according to claim 1, wherein the conductive particles includes a carbon particle.

7. The magnetic recording medium according to claim 1, wherein the magnetic layer includes a plurality of protrusions formed by the conductive particles on the surface thereof.

8. The magnetic recording medium according to claim 1, wherein the magnetic layer has a servo pattern, the servo pattern has a plurality of first magnetized regions and a plurality of second magnetized regions, and the plurality of first magnetized regions and the plurality of second magnetized regions are asymmetric with respect to an axis parallel to a width direction of the magnetic recording medium.

9. The magnetic recording medium according to claim 8, wherein an inclination angle of the first magnetized region with respect to the axis and an inclination angle of the second magnetized region with respect to the axis are different from each other, and of the inclination angle of the first magnetized region and the inclination angle of the second magnetized region, the larger inclination angle is 18° or more and 28° or less.

10. The magnetic recording medium according to claim 1, wherein the magnetic layer is configured to be capable of recording a signal with a data track width of 800 nm or less and a bit length of 46 nm or less.

11. The magnetic recording medium according to claim 1, further comprising an underlayer, an average thickness of the underlayer being 900 nm or less.

12. The magnetic recording medium according to claim 1, wherein an average thickness of the magnetic layer is 80 nm or less.

13. The magnetic recording medium according to claim 1, wherein an average thickness of the base is 4.4 μm or less.

14. A cartridge, comprising:

the magnetic recording medium according to claim 1.

15. A tape-shaped magnetic recording medium, comprising:

a base; and a magnetic layer, the magnetic layer including conductive particles, an average thickness of the magnetic recording medium being 5.3 μm or less, an average number of conductive particles per 400 μm$^2$ of a surface of the magnetic layer being 50 or more, an average conductive particle area of the surface of the magnetic layer being 35000 nm$^2$ or less, an average conductive particle area ratio of the surface of the magnetic layer being less than 2.00% wherein an average number of conductive particles having a particle size of 200 nm or more in a width direction of the magnetic recording medium per 400 μm$^2$ of the surface of the magnetic layer is 10 or more and 30 or less, wherein the average number of conductive particles, the average conductive particle area, and the average conductive particle area ratio are obtained from a measurement result by a C-AFM (Conductive Atomic Force Microscope).

* * * * *